US012579361B1

(12) United States Patent
Murthy et al.

(10) Patent No.: US 12,579,361 B1
(45) Date of Patent: Mar. 17, 2026

(54) COLLABORATIVE DATA ANALYTICS USING MACHINE LEARNING BASED LANGUAGE MODELS

(71) Applicant: Isotopes AI, Inc., Palo Alto, CA (US)

(72) Inventors: Arun Chikkatur Murthy, Palo Alto, CA (US); Gopal Vijayaraghavan, South San Francisco, CA (US); Prasanth Jayachandran, San Jose, CA (US)

(73) Assignee: Isotopes AI, Inc., Palo Alto, CA (US)

( * ) Notice: Subject to any disclaimer, the term of this patent is extended or adjusted under 35 U.S.C. 154(b) by 0 days.

(21) Appl. No.: 19/309,463

(22) Filed: Aug. 25, 2025

(51) Int. Cl.
G06F 40/263 (2020.01)
H04W 24/10 (2009.01)

(52) U.S. Cl.
CPC .......... G06F 40/263 (2020.01); H04W 24/10 (2013.01)

(58) Field of Classification Search
CPC ...... G06F 40/253; G06F 3/167; G06F 1/1605; G06F 1/1643; G06F 3/0412; H04W 24/10; G10L 15/22; H04M 1/72533; H04R 1/083; H04R 27/00
See application file for complete search history.

(56) References Cited

U.S. PATENT DOCUMENTS

| | | | | | |
|---|---|---|---|---|---|
| 8,849,652 | B2 * | 9/2014 | Weider | .................... | G10L 21/06 704/270.1 |
| 8,995,981 | B1 * | 3/2015 | Aginsky | .......... | H04M 1/72415 455/419 |
| 9,345,054 | B1 * | 5/2016 | Lu | ..................... | H04M 1/72415 |
| 9,443,527 | B1 * | 9/2016 | Watanabe | ............... | G10L 15/30 |
| 9,990,129 | B2 * | 6/2018 | Yang | ....................... | G06F 9/445 |
| 10,157,042 | B1 * | 12/2018 | Jayakumar | ............. | H04R 27/00 |
| 10,237,237 | B2 * | 3/2019 | Dawes | ............... | H04W 12/086 |
| 10,410,630 | B2 * | 9/2019 | Weng | ...................... | G10L 15/02 |
| 10,748,546 | B2 * | 8/2020 | Kim | ........................ | G10L 15/16 |
| 2004/0210647 | A1 * | 10/2004 | Jin | ...................... | H04L 12/2803 709/220 |
| 2009/0313026 | A1 * | 12/2009 | Coffman | ................. | G06F 3/167 704/E15.04 |
| 2012/0130513 | A1 * | 5/2012 | Hao | ....................... | G05B 15/02 700/90 |

(Continued)

FOREIGN PATENT DOCUMENTS

| | | | | | |
|---|---|---|---|---|---|
| EP | 1933499 | A1 * | 6/2008 | ......... | H04L 41/0894 |
| WO | WO-9859282 | A2 * | 12/1998 | ............. | H04L 67/51 |

*Primary Examiner* — Mohammad K Islam
(74) *Attorney, Agent, or Firm* — Fenwick & West LLP

(57) ABSTRACT

A system allows multiple users to interact with the system to perform data analysis. The system allows users to specify data analytics requests using high-level natural language requests. The system generates an execution plan based on natural language requests received from a particular user and executes the execution plan. The system detects a failure in executing the execution plan and determines whether to request help from another entity. The system may change the state of execution of the execution plan to a waiting state in which the system blocks execution until it receives an approval to proceed from an entity. The system receives a request to modify the execution plan from the entity and modifies the execution plan based on the request. The system iteratively performs the modification of the execution plan until an acceptable execution plan is generated.

20 Claims, 28 Drawing Sheets

(56)            References Cited

U.S. PATENT DOCUMENTS

| | | | |
|---|---|---|---|
| 2013/0211710 A1* | 8/2013 | Kennewick ............. | G10L 15/08 |
| | | | 704/275 |
| 2014/0135952 A1* | 5/2014 | Maehara ................ | G05B 15/02 |
| | | | 700/90 |
| 2014/0324410 A1* | 10/2014 | Mathews ................. | G09B 9/00 |
| | | | 703/22 |
| 2015/0256620 A1* | 9/2015 | Sugano ............... | H04L 67/1095 |
| | | | 709/217 |
| 2015/0379993 A1* | 12/2015 | Subhojit .............. | G10L 15/065 |
| | | | 704/275 |
| 2016/0283191 A1* | 9/2016 | Lu ........................... | G06F 3/165 |
| 2016/0344569 A1* | 11/2016 | Chun ................. | G06F 3/04817 |
| 2017/0105095 A1* | 4/2017 | Um ......................... | H04W 4/70 |
| 2017/0116986 A1* | 4/2017 | Weng ................... | G10L 13/033 |
| 2017/0256256 A1* | 9/2017 | Wang ..................... | G10L 15/30 |
| 2018/0013815 A1* | 1/2018 | Gold ..................... | H04L 63/00 |
| 2018/0137858 A1* | 5/2018 | Saxena .............. | H04L 12/2816 |
| 2018/0165061 A1* | 6/2018 | Nicolich-Henkin ........................ |  |
| | | | H04L 12/282 |
| 2018/0182387 A1* | 6/2018 | Chua ...................... | H04R 1/406 |
| 2018/0285065 A1* | 10/2018 | Jeong ..................... | G06F 3/167 |
| 2018/0285070 A1* | 10/2018 | Yoon .................... | G06F 3/0481 |
| 2018/0314490 A1* | 11/2018 | Lee ......................... | G10L 15/22 |
| 2019/0005944 A1* | 1/2019 | Subhojit ................ | G10L 15/22 |
| 2019/0058783 A1* | 2/2019 | Reid ..................... | H04M 1/185 |
| 2019/0215184 A1* | 7/2019 | Emigh .................. | G05B 15/02 |
| 2019/0287522 A1* | 9/2019 | Lambourne ............ | H04S 7/302 |
| 2019/0304455 A1* | 10/2019 | Jaygarl .................. | G10L 15/08 |
| 2020/0007356 A1* | 1/2020 | Mason ................ | H05B 47/155 |
| 2020/0028734 A1* | 1/2020 | Emigh ................... | H04L 67/10 |
| 2020/0234709 A1* | 7/2020 | Kunitake ............... | G06F 3/167 |

* cited by examiner

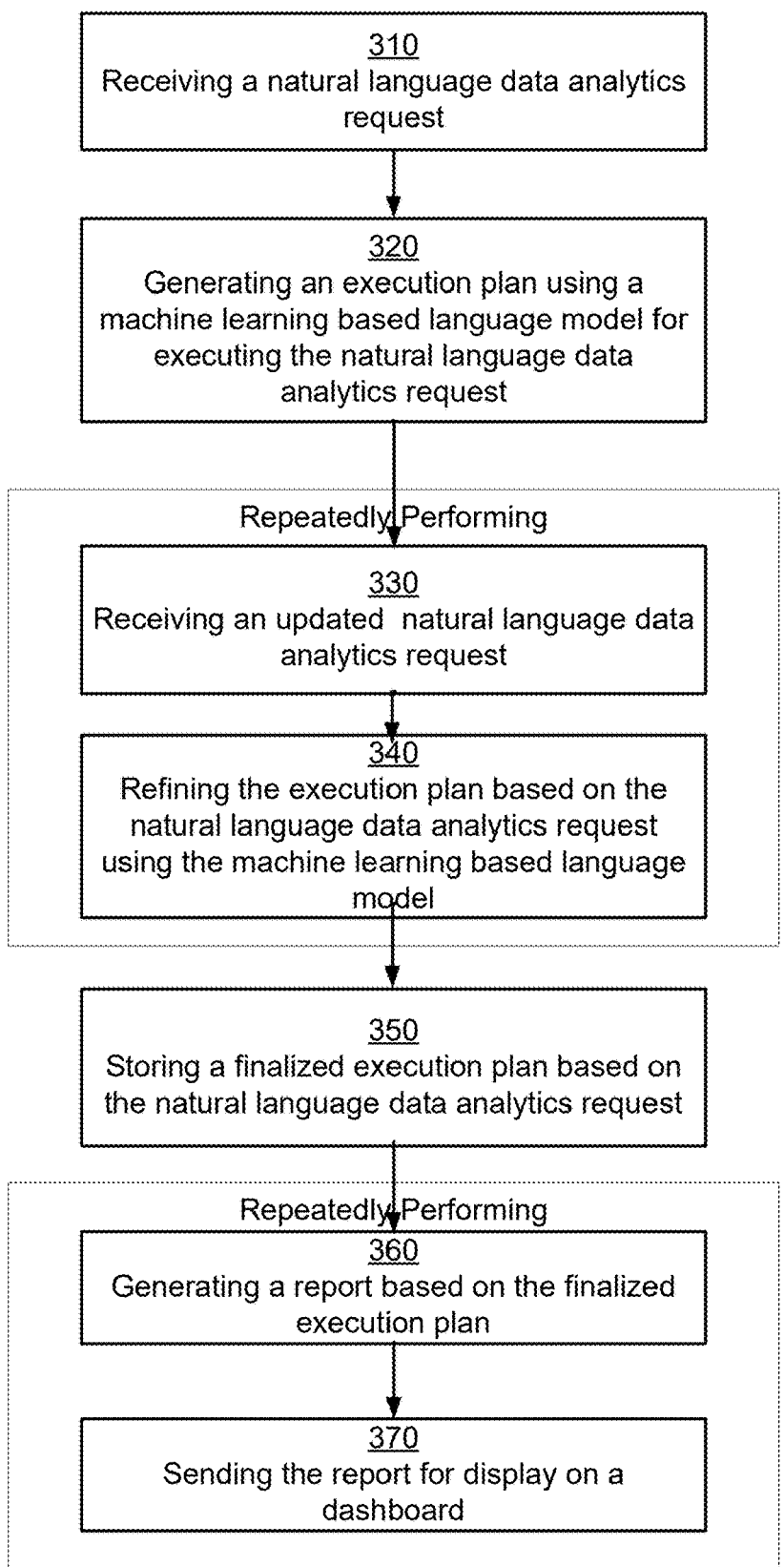

310
Receiving a natural language data analytics request

320
Generating an execution plan using a machine learning based language model for executing the natural language data analytics request Repeatedly Performing

330
Receiving an updated natural language data analytics request

340
Refining the execution plan based on the natural language data analytics request using the machine learning based language model

350
Storing a finalized execution plan based on the natural language data analytics request Repeatedly Performing

360
Generating a report based on the finalized execution plan

370
Sending the report for display on a dashboard

FIG. 3

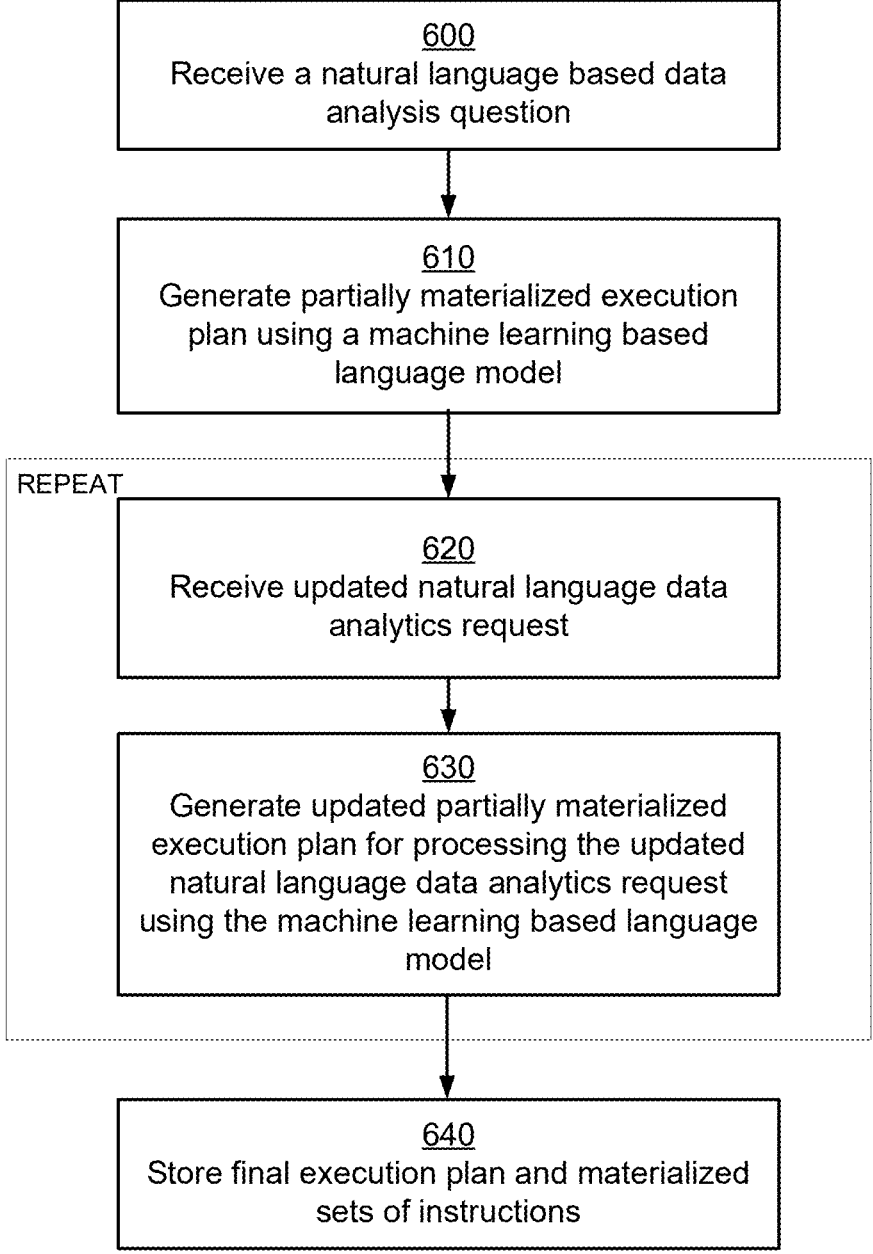

600
Receive a natural language based data analysis question

610
Generate partially materialized execution plan using a machine learning based language model

REPEAT

620
Receive updated natural language data analytics request

630
Generate updated partially materialized execution plan for processing the updated natural language data analytics request using the machine learning based language model

640
Store final execution plan and materialized sets of instructions

COLLABORATIVE DATA ANALYTICS USING MACHINE LEARNING BASED LANGUAGE MODELS

TECHNICAL FIELD

One or more aspects described herein relate generally to data analytics, and more specifically to performing collaborative data analytics using machine learning based language models.

BACKGROUND

Organizations generate large amounts of data, for example, data describing transactions, events generated by various systems, logs generated by various platforms, sensor data generated by IoT (Internet of Things) devices, and so on. The data generated is typically stored in heterogeneous systems using various formats, for example, in files, relational databases, documents, transaction logs, and so on. Organizations generate analytics reports based on such data to gain insights into the data. Analyzing such data is a complex process that requires technological expertise of various platforms that store the data as well as understanding of the high-level goals of analysis. Typically, users that are able to process data stored in various platforms are data engineers that have technical expertise with various systems. In contrast, users who exhibit understanding of high-level goals of analysis are domain experts that typically lack the low-level technical expertise of interacting with the various systems. There is often a communication gap between the two sets of users trying to achieve the goal of analyzing data of the organization. The gap may result in multiple iterations of interactions between users with different expertise in the best case and generation of incorrect reports resulting in poor analytic decisions in the worst case. Such processes are often error prone and cumbersome.

SUMMARY

In accordance with one or more aspects, a system, for example, an online system performs collaborative data analytics using data stored in data sources based on natural language requests from a plurality of entities such as users interacting with the system via client devices. The system uses machine learning based language models, for example, large language models (LLMs) to generate and modify execution plans for natural language data analytics requests and executes them.

The system receives, from a client device, a natural language data analytics request based on data stored in one or more data stores. The system generates an execution plan for processing the natural language data analytics request using a machine learning based language model and executes the execution plan for processing the natural language data analytics request. The system detects a failure in executing the execution plan for processing the natural language data analytics request. A failure may be one or more of an incorrect result generated by executing a step of the execution plan, one or more steps of the execution plan are taking longer than a threshold amount of time for execution, or one or more steps of the execution plan are consuming greater than a threshold amount of computing resources. Responsive to detecting the failure in executing the execution plan, the system identifies a target entity for handling the failure in executing the execution plan, and sends information describing execution of the execution plan to the target entity. The system receives a request to modify the execution plan from the target entity and modifies the execution plan based on the request by executing the machine learning based language model to generate a modified execution plan. The system executes the modified execution plan and sends a result of execution of the modified execution plan to the client device.

According to an embodiment, the system generates the execution plan by generating a prompt for the machine learning based language model. The prompt describes the natural language data analytics request. The system sends the prompt for execution of the machine learning based language model, receives a response generated by execution of the machine learning based language model, and extracts the execution plan from the response generated by execution of the machine learning based language model.

According to an embodiment, the system modifies the execution plan based on the request to modify the execution plan by generating a prompt for the machine learning based language model. The prompt describes the request to modify the execution plan, the execution plan, and a request to modify a first portion of the execution plan while retaining at least a second portion of the execution plan. The system sends the prompt for execution of the machine learning based language model, receives a response generated by execution of the machine learning based language model, and extracts the modified execution plan from the response generated by execution of the machine learning based language model.

According to an embodiment, the system processes natural language data analytics requests based on data stored in one or more data stores. The system generates a prompt for sending to a machine learning based language model. The system builds an execution plan for processing the natural language data analytics request based on the response received from the machine learning based language model. The system iteratively refines the execution plan for processing the natural language data analytics request, by repeatedly performing following steps. The system stores a finalized execution plan for processing the natural language data analytics request obtained by iteratively refining the execution plan. The system may execute the execution plan repeatedly to generate reports and send the generated reports for display via a user interface.

According to an embodiment, the system generates partially materialized execution plans for processing the natural language data analytics requests. The partially materialized execution plan comprises sets of instructions that are materialized (or frozen). A materialized set of instructions remains unchanged if the partially materialized execution plan is regenerated from the natural language data analytics request using the machine learning based language model. The system iteratively refines the partially materialized execution plan, by performing the following steps repeatedly. The system stores a finalized execution plan obtained by iteratively refining the partially materialized execution plan and executes the finalized execution plan to generate reports.

According to an embodiment, the system performs in-context learning of data analytics agents by generating execution plans for natural language data analytics requests specific to the data agent. A user provides several natural language data analytics requests relevant to the context for which the data analytics agents are being trained. Multiple users may provide feedback during execution of the execution plans of the natural language data analytics requests. Explicit feedback provided by users as well as implicit feedback is used for evaluating the new execution plan to determine whether the new execution plan should replace an existing execution plan stored in the system for a matching natural language data analytics request.

Embodiments of the invention include computer-implemented methods described herein, non-transitory computer readable storage media storing instructions for performing steps of the methods disclosed herein, and systems comprising one or more computer processors and computer readable non-transitory storage medium to perform steps of the computer-implemented methods disclosed herein.

BRIEF DESCRIPTION OF THE DRAWINGS

FIG. 3 is a flowchart illustrating a process for generating an execution plan based on a natural language analytics request, according to an embodiment.

FIG. 6 is a flowchart illustrating a process for generating an execution plan for processing a natural language data analytics request, according to an embodiment.

FIG. 15D shows a screenshot of a user interface for performing detailed analysis based on suggestions, according to an embodiment.

Figure 1:
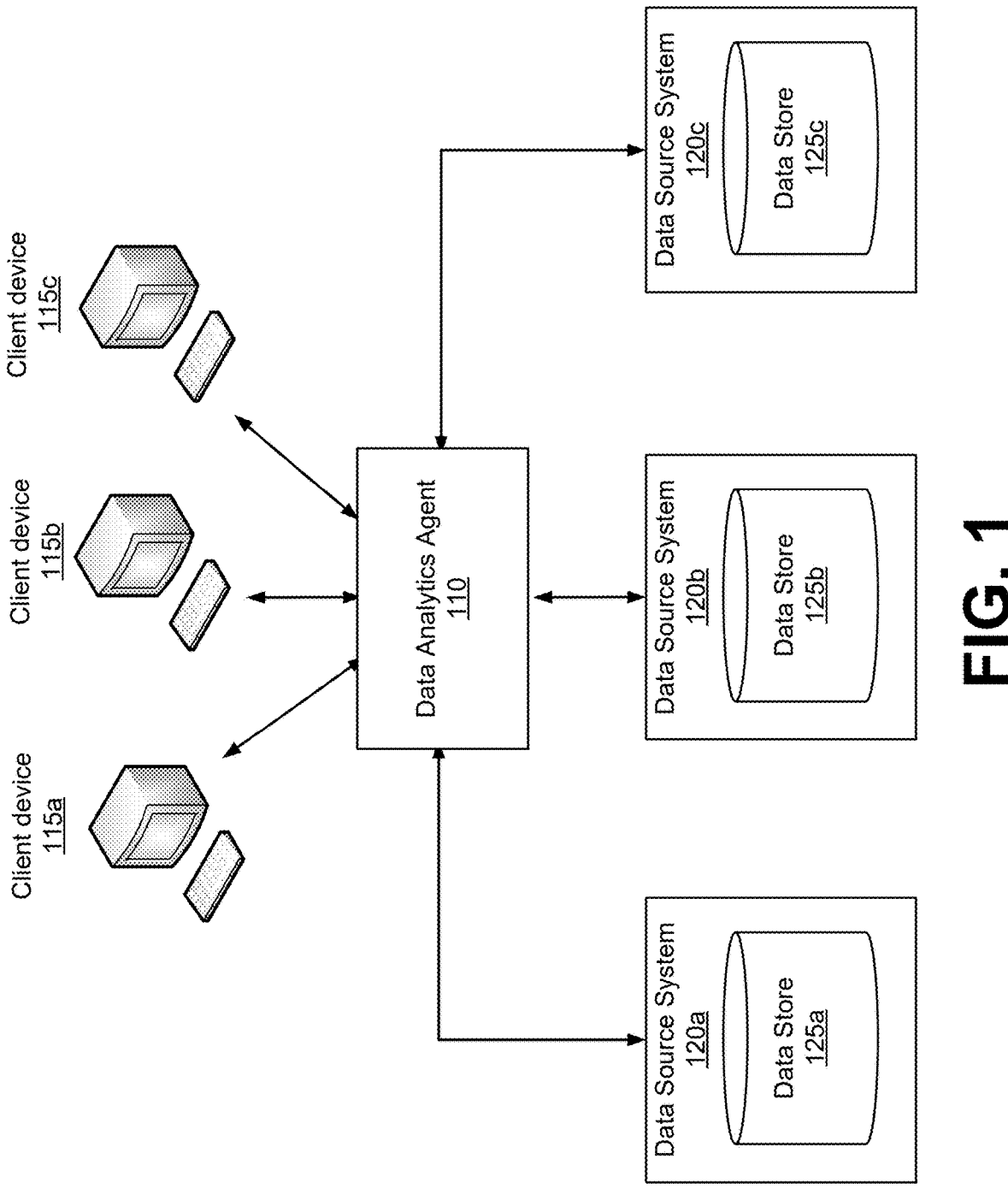
FIG. 1 illustrates an example system environment for an online system, in accordance with one or more embodiments.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Organizations often store data in various data sources, for example, relational databases, data warehouses, files, spreadsheets, logs, document databases and so on. Users that typically have expertise in interacting with such systems are data engineers. Data engineers typically perform various tasks such as cleansing of the data stored in various data stores and pre-processing it for analysis. Domain experts that understand high-level requirements of data analysis and the types of analytics reports that need to be generated interact with such data engineers to guide their data cleansing or data processing efforts.

In accordance with one or more aspects, a system, for example, an online system performs causation analysis of signals using machine learning based language models, for example, large language models (LLMs).

The system identifies a signal based on data obtained from one or more data sources. Examples of signals include metrics computed based on values received from data sources. The data sources may provide data of an enterprise, event logs, data generated by instrumented systems, sensor data, and so on. The system generates an execution plan for determining signal values of the signal based on data obtained from one or more data sources. Typically, the system starts analysis with aggregated data such as reports. To gain insight into causes for anomalies, the system utilizes additional fine-grained data that may be present in different data systems from the aggregate data.

The system repeatedly executes the execution plan for generating signal values of the signal by performing the following steps. The system determines the current signal value based on execution of the execution plan. The system determines whether the current signal value represents an anomaly based on a comparison of the current signal value with previous signal values. If the system determines that the current signal value represents an anomaly, the system performs causation analysis of the anomaly, by performing the following steps one or more times. The system proceeds to find additional sources of data which store data at higher fidelity in order to perform causation analysis of the anomaly. The system generates a prompt for a machine learning based language model. The prompt describes the anomaly and requests the machine learning based language model to identify one or more data stores and data values associated with the anomaly and represent the cause of the anomaly. The system sends the prompt for execution of the machine learning based language model and receives a response generated by execution of the machine learning based language model. The system extracts a set of data values associated with the anomaly from the response. If the system identifies more than one anomaly from the response, the system may choose to branch out concurrently and explore each signal deeper to identify the causation.

The system performs an action based on the set of data values, for example, by transmitting information describing the set of data values. According to an embodiment, the system identifies an entity associated with the set of data values identified as a cause of the anomaly. The entity may represent one or more users, one or more systems, one or more sensors generating sensor data. The system performs an action associated with the entity. The action may represent sending a message to a user associated with the entity, or taking a remedial action for preventing the anomaly.

According to an embodiment, the system determines whether the current signal value represents an anomaly based on the comparison by determining a delta signal value representing a change in signal value determined based on the current signal value, comparing the delta signal value with a threshold value. The system determines that the current signal value represents an anomaly if the delta signal value exceeds the threshold value.

According to an embodiment, the system determines different threshold values for different contexts. A context associated with the signal may be determined based on one or more of: a location associated with the signal, a time associated with the signal, one or more users associated with the signal, or one or more data sources associated with the signal.

According to an embodiment, the system generates a set of data values representing the cause of the anomaly based on a prompt and includes information describing the set of data values in the next prompt to generate a cause of the set of data values. Accordingly, the next generates a second prompt for a machine learning based language model. The second prompt describes the first set of data values extracted from the first response. The system sends the second prompt for execution of the machine learning based language model and receives a second response generated by execution of the machine learning based language model. The system extracts a second set of data values associated with the anomaly from the second response. The second set of data values represents the cause of the first set of data values that in turn represents the cause of the anomaly. The system may repeat this process a few times to identify the final set of data values as the root cause of the anomaly.

According to an embodiment, the system initiates multiple causation analyses concurrently, exploring different potential causes in parallel and abandoning paths if subsequent signals indicate a low likelihood for those causes.

The system uses the technique of AI based causation analysis and extends it to forecasting (going broad v/s deep), hypothesis, trend analysis and other kinds of ambient analysis based on historic user query patterns. Ambient analysis includes root cause analysis as well as forecasting and other types of analysis. Furthermore, the system performs all the analysis and pushes results to the user as compared to the traditional method of the user pulling answers by manually querying the data. For example, the system automatically detects whether a signal represented by data generated by the system has an anomaly. If the system determines the anomaly, the system automatically performs causation analysis of the anomaly. The system analyzes the data sources available for the causation analysis. If the available data sources fail to provide the required information for causation analysis, the system identifies additional data sources that may store fine grained information needed for further causation analysis. The system iteratively continues to find causes until a root cause of the anomaly is determined. The system sends information describing the root cause to a user or automatically takes a remedial action.

System Environment

FIG. 1 shows the overall system environments in which a data analytics agent operates, according to an embodiment. FIG. 1 illustrates an example system environment for an online system 200, in accordance with one or more embodiments. The system environment illustrated in FIG. 1 includes client device 115, a data analytics agent 110 and one or more data source systems 120. Alternative embodiments may include more, fewer, or different components from those illustrated in FIG. 1, and the functionality of each component may be divided between components differently from the description below. Additionally, each component may perform their respective functionalities in response to a request from a human, or automatically without human intervention. Additionally, any number of client devices 115 may interact with the data analytics agent 110. A data analytics agent 110 may also be referred to herein as an artificial intelligence agent or AI agent. Multiple data analytics agent 110 may interact with each other to perform a data analytics process.

Figure 2:
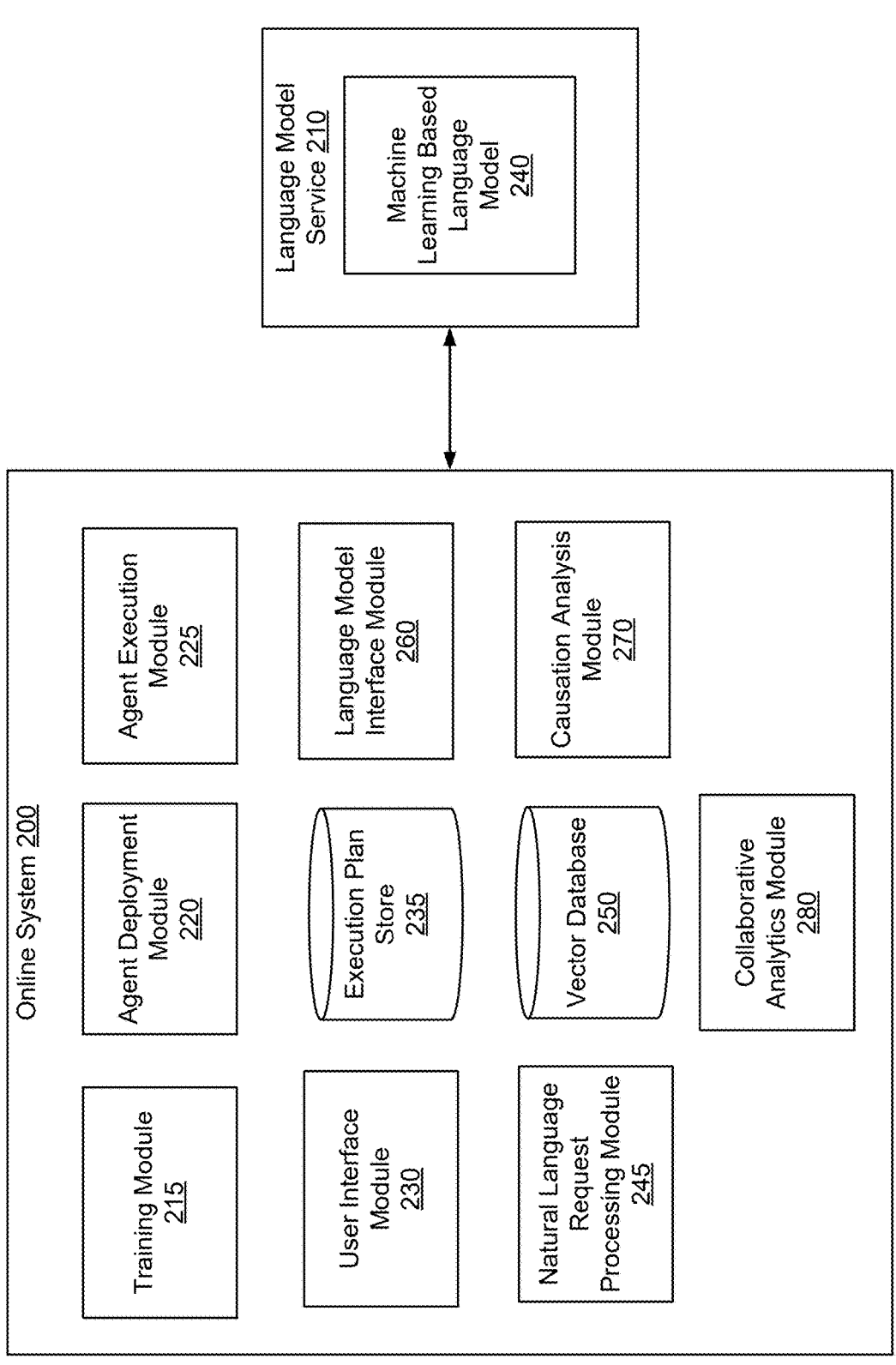
FIG. 2 shows the system architecture of an online system interacting with a language model service, according to an embodiment.

The data analytics agent 110 may execute in an online system, for example, the online system 200 illustrated in FIG. 2. The data analytics agent 110 receives natural language questions from the client device 115. The client device 115 may display a user interface that allows an expert, for example, an analyst to input natural language questions. The natural language questions may specify a data analytics report based on data stored in various data stores 125a, 125b, 125c available in the data source systems 120a, 120b, 120c respectively. A natural language question that requests a data analytics report may also be referred to herein as a natural language data analytics question or a natural language analytics question. The data analytics agent 110 uses a machine learning based language model to generate an execution plan for processing the natural language question. The execution plan is executed to generate the report requested by the user via the client device 115. The report is displayed via a user interface, for example, a dashboard displayed via a client device 115.

Although FIG. 1 shows a single data analytics agent 110, other embodiments have multiple data analytics agents 110. For example, different agents may be trained to interact with different types of data sources; certain data analytics agents 110 may have the knowledge to perform specific type of analytic processing and so on. According to an embodiment, the system creates a network of agents that interact with each other to process the full data analysis pipeline. For example, a data analytics agent 110 that is trained to generate high level process flow interacts with data analytics agents 110 that are trained to process individual steps of the high-level process flow and coordinates the interactions between different data analytics agents 110. Accordingly, a hierarchy of data analytics agents 110 may be created to divide the data analytics task recursively into smaller subtasks and process them.

The client device 115 can be a personal or mobile computing device, such as a smartphone, a tablet, a laptop computer, or desktop computer. In some embodiments, the client device 100 executes a client application that uses an application programming interface (API) to communicate with the data analytics agent 110. The client device 100 presents a user interface that allows the user to interact with the data analytics agent 110.

The client device 115 allows users to interact with the data analytics agent 110 via a network. (not shown in FIG. 1) that enables communications between the devices. In one embodiment, the network uses standard communications technologies and/or protocols. The data exchanged over the network can be represented using technologies and/or formats including the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. Depending upon the embodiment, the network can also include links to other networks such as the Internet.

System Architecture

FIG. 2 shows the system architecture of an online system interacting with a language model service, according to an embodiment. Other embodiments can have fewer or more modules than indicated in FIG. 2.

The online system 200 illustrated in FIG. 2 includes a training module 215, an agent deployment module 220, an analytics agent execution module 225, a user interface module 230, an execution plan store 235, a language model interface module 260, a natural language request processing module 245, a vector database 250, a causation analysis module 270, and a collaborative analytics module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

Figure 15A:
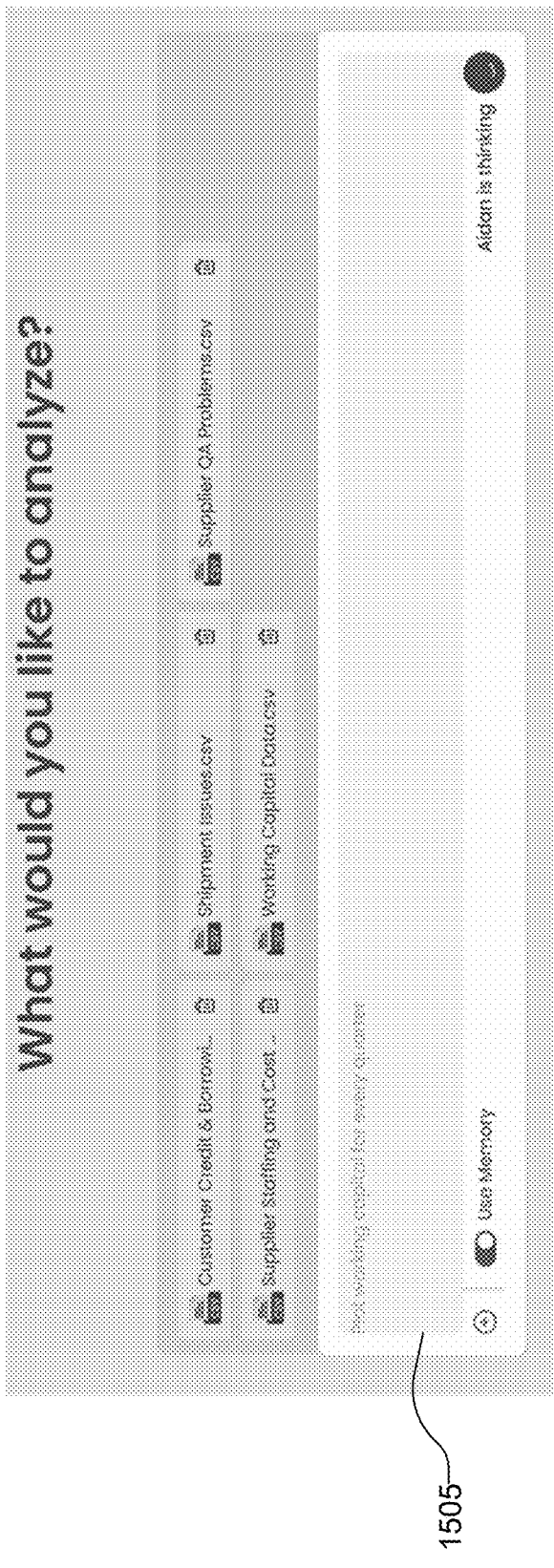
FIG. 15A shows a screenshot of a user interface for receiving information describing a signal and a schedule for executing the signal, according to an embodiment.

The user interface module 230 configures user interfaces for presentation to a user via a client device 100. The user interfaces configured by the user interface module 230 allow users to provide information to the online system 200, for example, natural language data analytics requests. The FIGS. 15A-10G shows screenshots of various user interfaces configured by the online system 200 according to various embodiments.

The training module 215 generates agents trained to perform specific tasks. For example, an agent may be trained to interact with a particular type of data store. According to an embodiment, the training of a data analytics agent is based on in-context learning. For example, a user such as an expert user, uses the data analytics agent to interact with a data store in a particular context and makes several natural language data analytics requests specific to the context. The online system asks the user several questions related to evaluation of each natural language data analytics request that is processed. The user provides feedback, for example, by approving whether certain types of techniques used for data analytics are suitable for use in the context, whether the instructions used for performing certain steps conform to certain policy constraints of the organization, and so on.

The agent deployment module 220 generates artifacts that store all the information needed to instantiate an agent on a system. The agent deployment module 220 transmits the artifacts to a target system so that the target system can instantiate the agent and execute it.

The analytics agent execution module 225 receives the artifacts provided by the agent deployment module 220 and executes the agent. The agent may interact with a system for example, a data store. An agent may interact with a user by receiving natural language requests from the user and processing the natural language requests.

Figure 11:
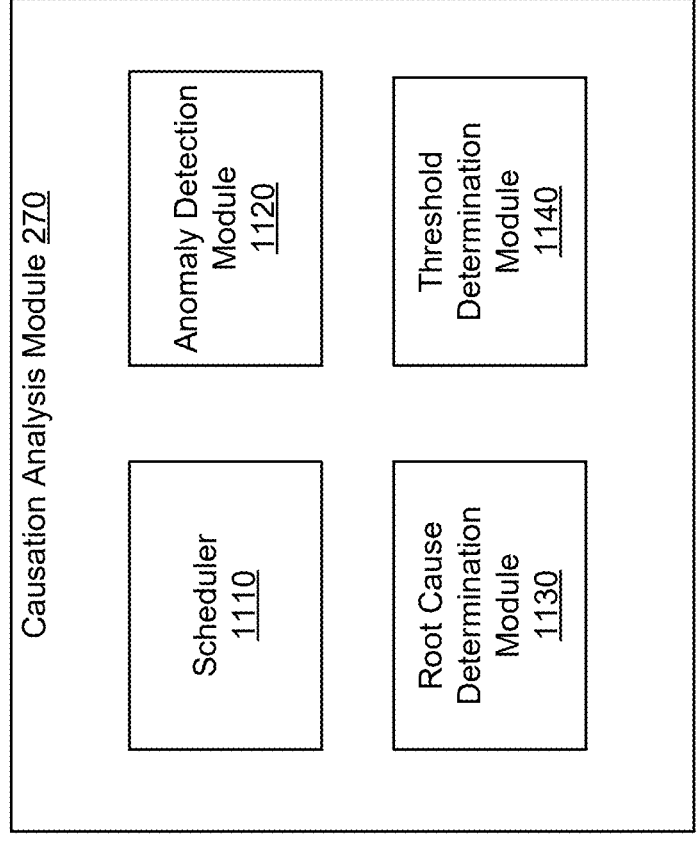
FIG. 11 illustrates the system architecture of a causation analysis module, according to an embodiment.

The causation analysis module 270 performs causation analysis of anomalies determined in signal values to determine a root cause and takes remedial actions based on the root cause. Details of the architecture of the causation analysis module 270 are illustrated in FIG. 11 and described in connection with FIG. 11.

Figure 17:
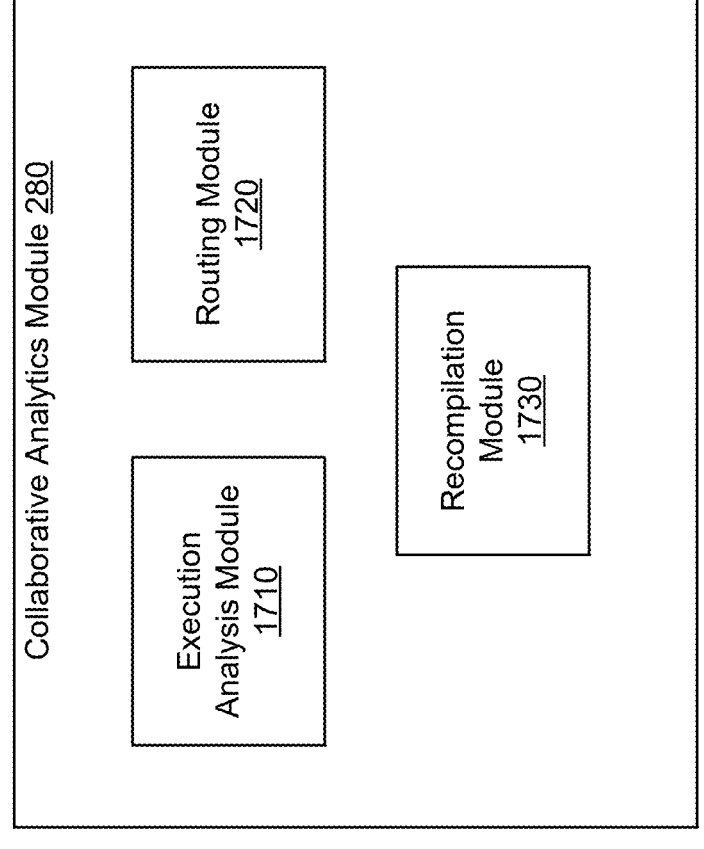
FIG. 17 shows the system architecture of collaborative analytics module, according to an embodiment.

The collaborative analytics module 280 allows multiple users to collaborate on a data analytics project, for example, to generate the same report or sets of reports. The collaborative analytics module 280 allows users to provide natural language based data analytics requests to generate or modify an execution plan for performing data analytics. Details of the architecture of the collaborative analytics module 280 are illustrated in FIG. 17 and described in connection with FIG. 17.

The user interface module 230 configures user interfaces and presents to the user. The user interface module 230 receives user inputs via the user interfaces and provides the user input to appropriate modules of the online system 200. For example, the user interface module 230 may receive natural language requests and provide them to the natural language request processing module 245. The user interface module 230 further receives results of processing the natural language requests from the machine learning based language model 240 and provides them to the user. For example, the result of processing a natural language request may be a visualization of a particular report. The user interface module 230 configures a user interface that displays the visualized report and sends for display to a client device 115.

The execution plan store 235 stores execution plans of previously received natural language requests, for example, natural language data analytics requests. The online system 200 may execute a natural language data analytics request on a periodic basis to display a visualization of a report via a dashboard. According to an embodiment, the online system 200 may receive a modification of previously received natural language data analytics requests and access the closest matching natural language data analytics requests that was previously processed. The online system 200 may use the vector database to identify the closest natural language data analytics request to the input natural language data analytics request received, for example, based on vector distances of previously processed natural language data analytics requests from the input natural language data analytics request. The online system 200 accesses the execution plan of the closest natural language data analytics request that was previously processed and modifies the execution plan of the previously processed natural language data analytics request to generate an execution plan of the input natural language data analytics request.

According to an embodiment, the execution plan represents a data pipeline, and each step of the execution plan corresponds to a stage of the data pipeline. Each stage receives data generated by a previous stage, processes the data and provides the data as input to the next stage in the pipeline. The first stage receives input that is processed by the data pipeline and the last stage outputs the result of executing the data pipeline.

The language model interface module 260 interfaces with the language model service 210. The language model service 210 includes a machine learning based language model 240. The machine learning based language model 240 may generate prompts for sending to the language model service 210. The machine learning based language model 240 invokes APIs (application programming interfaces) of the language model service 210 to execute the 240 using the generated prompt and receive a response obtained by executing the machine learning based language model 240. The language model service 210 may be invoked by other modules of the online system 200 for example, the natural language request processing module 245.

The natural language request processing module 245 executes the various processes described herein to receive a natural language request, for example, a natural language data analytics request and generates an execution plan for processing the natural language request. The execution plan may comprise a sequence of steps. Each step may further comprise steps to perform specific tasks. For example, natural language data analytics request may identify a particular type of data analysis and the execution plan may comprise steps such as accessing data from a specific source, segmenting users based on a particular technique, using a specific statistical model to analyze the segments, generate a report, generate visualization of the report, and so on.

According to an embodiment, the online system stores information such as natural language data analytics requests received in the past in a vector database 250. According to an embodiment, the natural language request processing module 245 generates a vector representation of natural language data analytics requests. The vector representation of a natural language data analytics request may be an embedding representing an output of a hidden layer of a neural network trained to encode natural language text. According to an embodiment, the natural language request processing module 245 requests the machine learning based language model to generate the vector embeddings corresponding to a natural language data analytics request. The vector database 250 allows the online system 200 to identify past natural language data analytics requests that are similar to an input natural language data analytics request. The vector database 250 identifies natural language data analytics requests having vector representations that are within a threshold vector distance of an input natural language data analytics request. The vector distance may be based on a cosine similarity metric. The online system 200 may provide a vector representation of a natural language data analytics request to the vector database 250 to determine all past natural language data analytics requests that are similar to an input natural language data analytics request so as to access their execution plans from the execution plan store 235.

In one or more embodiments, the machine learning based language model 240 is a large language model (LLM) trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 200 or one or more entities different from the online system 200. An LLM may be trained on a large amount of data from various data sources. For example, the data sources include websites, articles, posts on the web, and the like. From this massive amount of data coupled with the computing power of LLMs, the LLM is able to perform various tasks and synthesize and formulate output responses based on information extracted from the training data.

In one or more embodiments, the machine learning based language model 240 is a transformer neural network architecture. Specifically, the transformer model is coupled to receive sequential data tokenized into a sequence of input tokens and generates a sequence of output tokens depending on the task to be performed. In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While an LLM with a transformer-based architecture is described as a primary embodiment, it is appreciated that in other embodiments, the machine learning based language model 240 can be configured as any other appropriate architecture including, but not limited to, long short-term memory (LSTM) networks, Markov networks, BART, generative-adversarial networks (GAN), diffusion models (e.g., Diffusion-LM), and the like.

The training module 215 trains machine learning models used by the online system 200. The online system 200 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

In one or more embodiments, the online system 200 receives a pre-trained machine learning based language model 240 and the training module 215 additionally fine-tunes parameters of the machine learning based language model 240 using multiple instances of training data. An instance in the training data may include strings or sentences obtained by concatenating inputs and expected outputs of the machine learning based language model. For example, the training data may comprise natural language questions received from users with lists of items, item types, or categories of items associated with the natural language question. The machine learning based language model receives an input sentence with missing tokens from the output portion of the input sentence and predicts the missing tokens. A loss function is computed by aggregating loss values obtained from the predicted tokens and the known tokens of the output portion of the sentences provided as training data. The errors obtained from the loss function are backpropagated to update parameters of the machine-learned model.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The training module 215 generates the set of parameters for a machine learning model by "training" the machine learning model. Once trained, the machine learning model uses the set of parameters to transform inputs into outputs.

The training module 215 trains a machine learning model based on a set of training examples. Each training example includes input data to which the machine learning model is applied to generate an output. For example, each training example may include user data, item data, or order data. In some cases, the training examples also include a label which represents an expected output of the machine learning model. In these cases, the machine learning model is trained by comparing its output from input data of a training example to the label for the training example.

The training module 215 may apply an iterative process to train a machine learning model whereby the training module 215 trains the machine learning model on each of the set of training examples. To train a machine learning model based on a training example, the training module 215 applies the machine learning model to the input data in the training example to generate an output. The training module 215 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The training module 215 updates the set of parameters for the machine learning model based on the score generated by the loss function. For example, the training module 215 may apply gradient descent to update the set of parameters.

With respect to the machine-learned models hosted by the model serving system 150, the machine-learned models may already be trained by a separate entity from the entity responsible for the online system 200. In another embodiment, when the model serving system 150 is included in the online system 200, the training module 215 may further train parameters of the machine-learned model based on data specific to the online system 200 stored in the data store 125. As an example, the training module 215 may obtain a pre-trained transformer language model and further fine tune the parameters of the transformer model using training data stored in the data store 125.

Generating Execution Plans for Natural Language Data Analytics Requests

FIG. 3 is a flowchart illustrating a process for generating an execution plan based on a natural language analytics request, according to an embodiment. Alternative embodiments may include more, fewer, or different steps from those illustrated in FIG. 3, and the steps may be performed in a different order from that illustrated in FIG. 3. The steps are described as being performed by a system, for example, the online system 200 and may be performed by one or more modules of the system. Additionally, each of these steps may be performed automatically by the online system without human intervention.

As shown in the flowchart of FIG. 3, the system receives 310 a natural language data analytics request. The natural language data analytics request is a request specified using natural language and requesting information based on data analytics performed using data stored in one or more data stores 125. The natural language data analytics request may be received from a user who is a domain expert, for example, an analyst.

The system generates 320 an execution plan for processing the natural language data analytics request. The execution plan is generated using a machine learning based language model 240. According to an embodiment, the system generates a prompt for sending to a machine learning based language model. The prompt is based on the natural language data analytics request. The prompt requests the machine learning based language model 240 to generate an execution plan for processing the natural language data analytics request. The system sends the prompt to the machine learning based language model, for example, by invoking an API (application programming interface) of the language model service 210. The system receives a response from the language model service 210. The response is generated by the machine learning based language model 240 by processing the prompt. The system processes the response to extract the execution plan from the response. Accordingly, the system generates 320 the execution plan for processing the natural language data analytics request based on a response received from the machine learning based language model;

The system iteratively refines the execution plan for processing the natural language data analytics request by performing steps including 330 and 340. The system provides the execution plan for display to the user, for example, the analyst. The analyst may review the execution plan and revise the natural language data analytics request to provide an updated natural language data analytics request. For example, if the execution plan uses a particular model M1 for performing a specific step of analysis, the user may specify via the natural language data analytics request to use a different model M2 instead of model M1. The models M1 and M2 may be statistical models or may be other kinds of models that perform specialized processing. The data analytics agent refines 340 the execution plan based on the natural language data analytics request using the machine learning based language model. The data analytics agent also generates the instructions for executing the model for processing the required step.

The system generates an updated prompt based on the updated natural language data analytics request and provides the updated prompt to the machine learning based language model 240. The system receives a response from the language model service 210. The response is generated by executing the updated response and includes an updated execution plan for processing the natural language data analytics request. The system extracts the updated execution plan from the updated response received from the machine learning based language model. The steps 330 and 340 may be repeated multiple times until the user approves the execution plan as being final.

According to an embodiment, the system configures and presents a user interface to the user describing the details of individual steps of the execution plan. The system receives feedback on individual steps from the user. For example, the data analytics agent 110 may have processed a particular step of analysis using a specific technique. The user may modify the natural language request to specify a different technique for performing that step of analysis. The system finalizes the execution plan after each step of the execution plan is approved by the user.

The system stores 350 the finalized execution plan for processing the natural language data analytics request obtained as a result of the iterative refinement of the execution plan. The system may generate several such execution plans for different natural language data analytics requests.

The execution plans may be accessed for processing the natural language data analytics requests that are received subsequently. For example, natural language data analytics requests may be included in a dashboard for display to a user. The dashboard may be updated periodically to display updated reports based on the natural language data analytics requests. Accordingly, the system repeats one or more times the steps 360 and 370. The system executes 360 the finalized execution plan to generate a report and sends 370 the generated report for displaying via a user interface.

According to an embodiment, the system saves sets of instructions that perform specific tasks that represent steps of execution plans. The saved sets of instructions are associated with the description of the step that they correspond to. This allows the system to reuse the sets of instructions. For example, a set of instructions for performing a particular step S1 of execution plan E1 of a natural language data analytics request R1 may be saved. Subsequently the system receives another natural language data analytics request R2. The system generates an execution plan E2 for the natural language data analytics request R2 and determines whether any step of the execution plan matches a step for which sets of instructions were previously generated and stored. If the system determines that a step S2 of the execution plan E2 matches the description of the step S2, the system reuses the set of instructions for step S1 for performing step S2. This reuse of sets of generated instructions allows efficiently generating execution plans and also provides consistency in results of execution of different natural language data analytics requests. For example, the machine learning based language model used for generation of instructions may be non-deterministic. As a result, the step S2 of execution plan E2 in the above example may use a different model for performing analysis compared to step S1 of execution plan E1. As a result, the results of execution of the two requests R1 and R2 may be significantly different even if the differences in the requests R1 and R2 are minor. The reuse of sets of generated instructions avoids such discrepancies across multiple executions of the same natural language data analytics requests as well as across executions of similar natural language data analytics requests.

Furthermore, the sets of instructions generated conform to constraints, for example, policy constraints of an organization requiring certain types of analysis to be performed using specific techniques or models. The reuse of sets of instructions that were previously approved results in ensuring that subsequent execution plans that reuse the set of instructions also conform to the constraints. This results in simplifying enforcement of policies across organizations.

Furthermore, reuse of sets of instructions previously generated is efficient since the machine learning based language model is not invoked for generating the set of instructions. Machine learning based language models are typically computationally intensive and use significant computational resources. Furthermore, if the machine learning based language model is executing on a separate server such as the language model service 210, the system also saves on network resources if the amount of data being transmitted to and from the language model service 210 is significant for generating the set of instructions for individual steps of the execution plan. As a result, the system saves on computational resources as well as networking resources by reusing the sets of instructions generated for steps across execution plans.

According to an embodiment, the prompt generated for the machine learning based language model is provided instructions in the prompt to generate instructions to invoke a set of instructions that was previously generated and stored. For example, if the set of instructions needs specific parameter values to interface with the rest of the execution plan, the machine learning based language model generates instructions for extracting the parameter values and providing them as input to the set of instructions being invoked. The machine learning based language model is provided with instructions in the prompt to generate instructions in the execution plan to receive any data or results generated by the set of instructions and provide them to a subsequent step of the execution plan.

According to an embodiment, the system generates prompts that ask the machine learning based language model to treat the stored set of instructions as inline code that is included in the execution plan without any modifications. Accordingly, the prompt generated for the machine learning based language model includes explicit instructions to not modify the set of previously generated instructions that are identified. The prompt provides instructions to the machine learning based language model to run the stored set of instructions without modifying them and to adjust the portions of the instructions that invoke the set of instructions to prepare the parameters passed as input to the set of instructions and appropriately set the parameter values before invoking the instructions.

The system further generates descriptions of the sets of instructions that are stored. The description acts as documentation of the sets of instructions. The system correlates the description of the set of instructions with steps of the execution plans and the natural language data analytics requests that resulted in generation of the execution plans. This provides documentation for the processes used in the organization, for example, business processes. The documentation describes how specific processing is performed in the organization. According to an embodiment, the system generates documentation for processes of an organization by collecting the descriptions of the various sets of instructions that are frozen and categorizing them based on the natural language data analytics requests. For example, the system may identify a category of natural language data analytics requests that invoke the same set of instructions and generate documentation describing how the category of natural language data analytics requests is processed in the organization. Furthermore, the documentation of the processes also supports standardization of the processes for the organization.

The system further determines whether two different natural language data analytics requests are processing the same step using different computations. This allows the system to determine whether different groups within the organization are consistently using the same technique for a particular step of analysis, for example, if they are using the same model for certain data analytics steps. The system can analyze the sets of instructions used by different natural language data analytics requests to determine whether any user or group within the organization does not conform to the policy constraints specified by the organization. As a result, the system helps enforce polices of the organization specifying how specific processes or process steps related to data analysis should be carried out within the organization.

Partially Materialized Execution Plans

According to an embodiment, the system generates partially materialized execution plans that include one or more sets of instructions that are identified as frozen. A machine learning based language model may include stochastic components that result in generation of non-deterministic outputs. As a result, a machine learning based language model may generate different responses each time the machine learning based language model is executed for the same input. A differ execution plan may be generated each time even if the same natural language data analytics request is processed using the same prompt that is provided as input to the machine learning based language model. As a result, the execution of the same natural language data analytics request at different times may return different results.

The system according to an embodiment, identifies a set of instructions (also referred to as code) of the execution plan generated from a natural language data analytics request and freezes the identified set of instructions so that they do not change when the execution plan is regenerated by the machine learning language based model for processing the same natural language data analytics request. Freezing a set of instructions of an execution plan is also referred to herein as materializing the set of instructions. The set of instructions that is materialized may also be shared across execution plans generated for other natural language data analytics requests.

Figure 4:
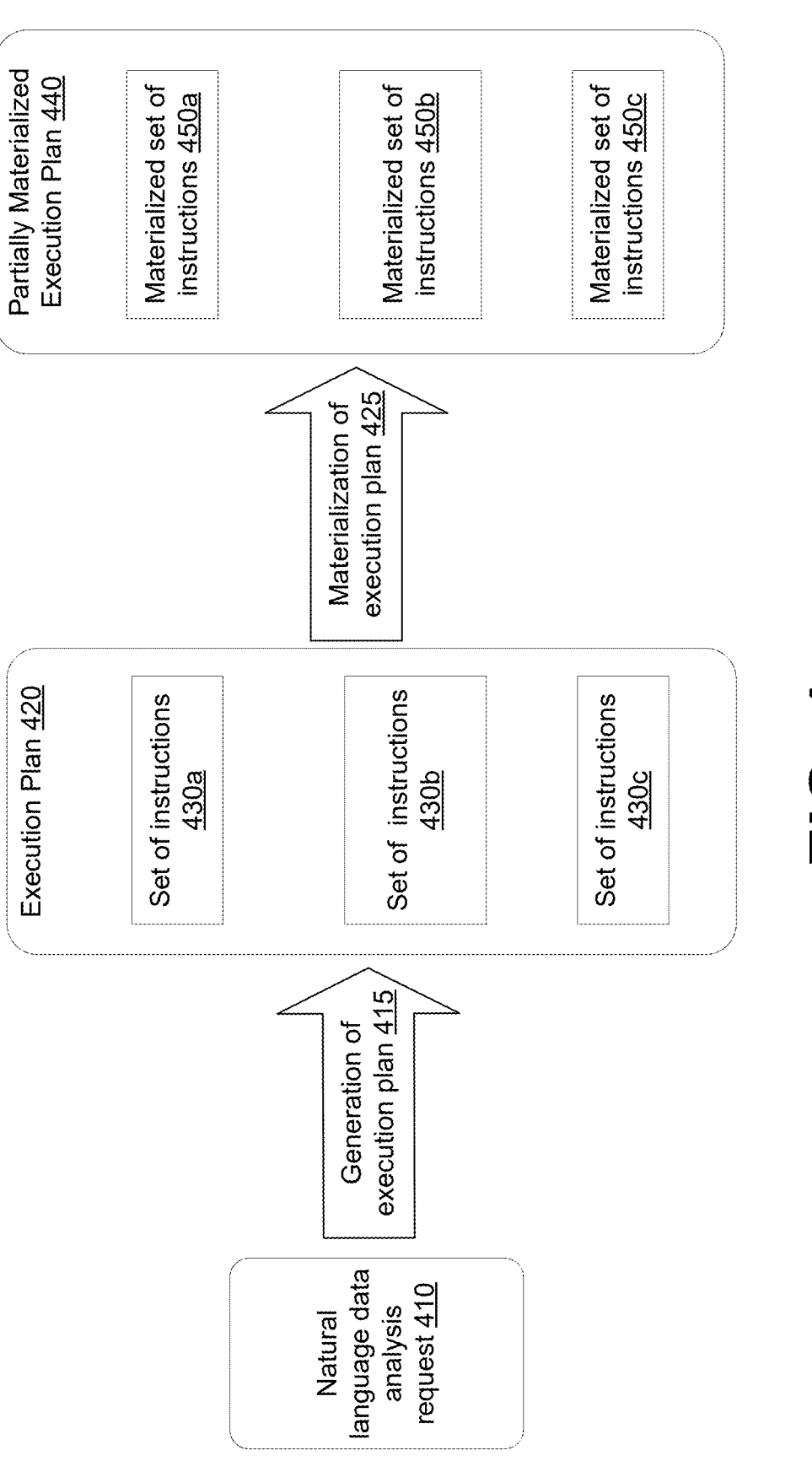
FIG. 4 illustrates partial materialization of an execution plan for a natural language data analytics request, according to an embodiment.

FIG. 4 illustrates partial materialization of an execution plan for a natural language data analytics request, according to an embodiment. The system receives a natural language data analytics request 410. The system generates 415 the execution plan for processing the natural language data analytics request 410. The system identifies one or more sets of instructions 430a, 430b, 430c for materializing. Materializing a set of instructions represents freezing the set of instructions so that the materialized set of instructions is not modified even if the machine learning based language model is executed again with the same input, even if the machine learning based language model has non-deterministic behavior. A materialized set of instructions may also be referred to herein as a frozen set of instructions or an immutable set of instructions.

For example, the sets of instructions may represent core computation of the execution plan that may have significant impact on the result of executing the execution plan. The system materializes 425 the execution plan 420 to obtain the materialized execution plan 440 by materializing each identified set of instructions 430a, 430b, 430c to obtain materialized sets of instructions 450a, 450b, 450c respectively. The system may not materialize all instructions of the execution plan 420, for example, instructions that are less critical to the computation of the result. The materialization of various sets of instructions may be performed iteratively, for example, as the system generates instructions for each step of the execution plan.

Figure 5A:
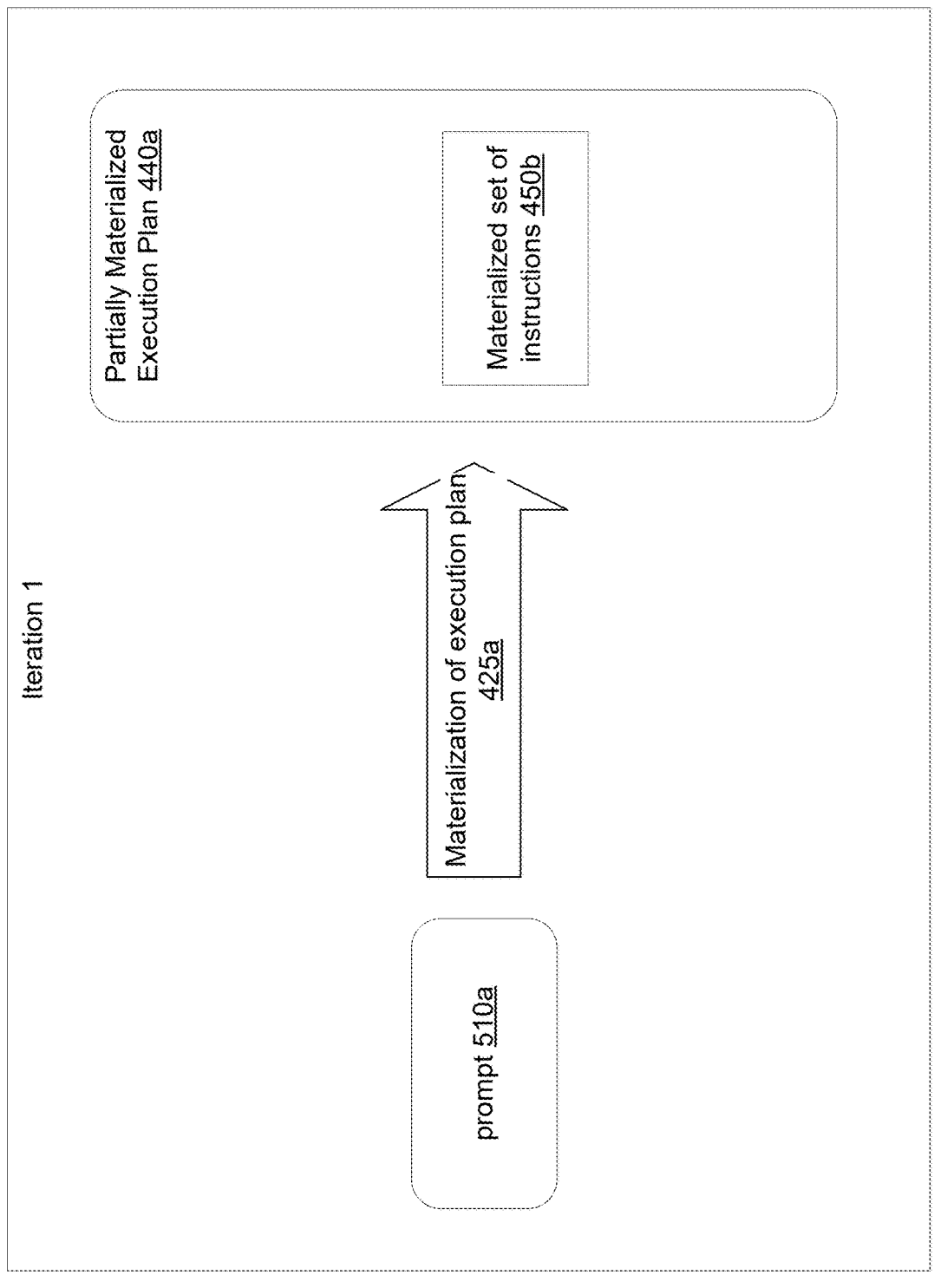
FIG. 5A shows an iteration of generation of partially materialized execution plan, according to an embodiment.
Figure 5B:
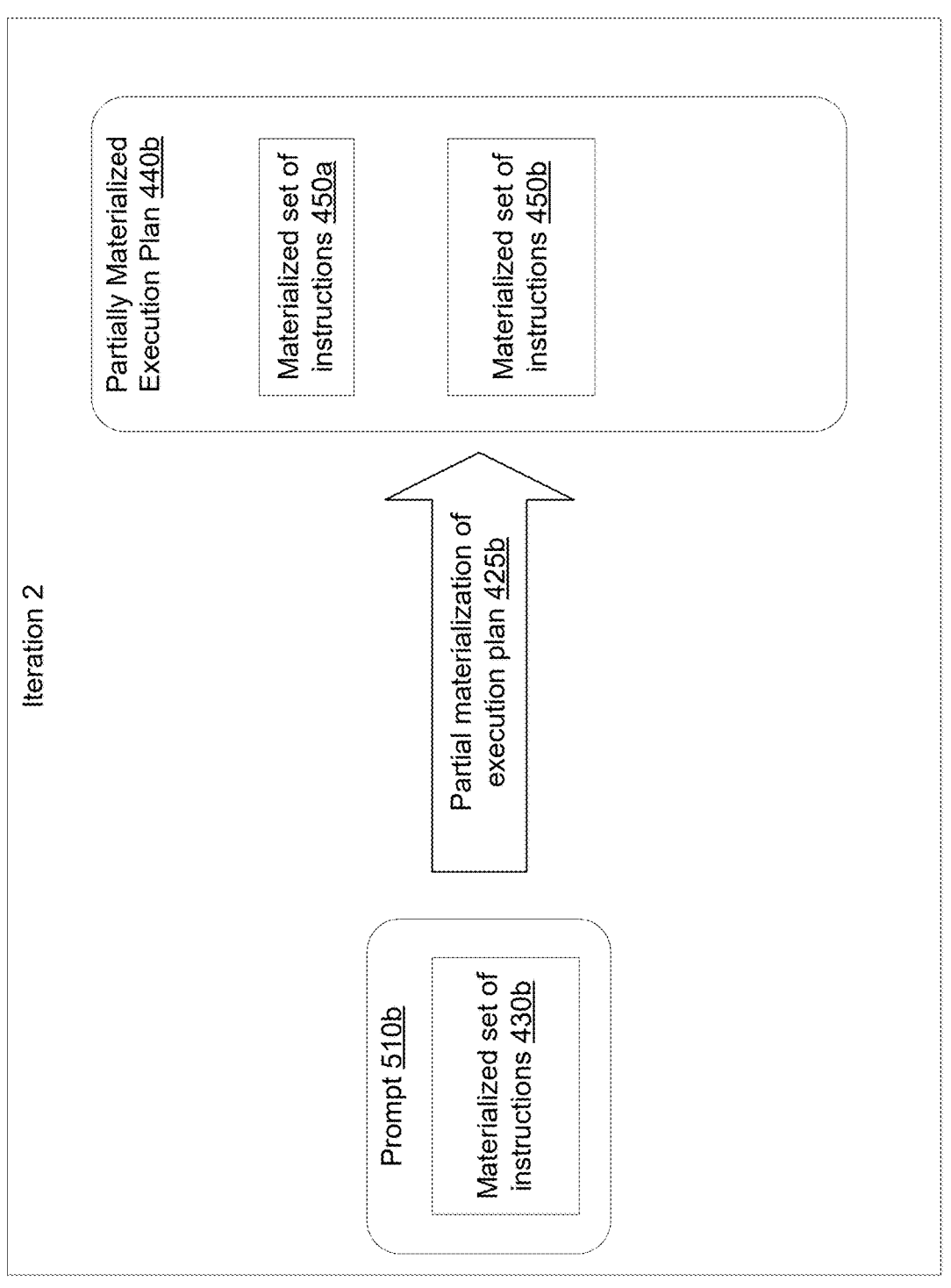
FIG. 5B shows a subsequent iteration of generation of partially materialized execution plan, according to an embodiment.
Figure 5C:
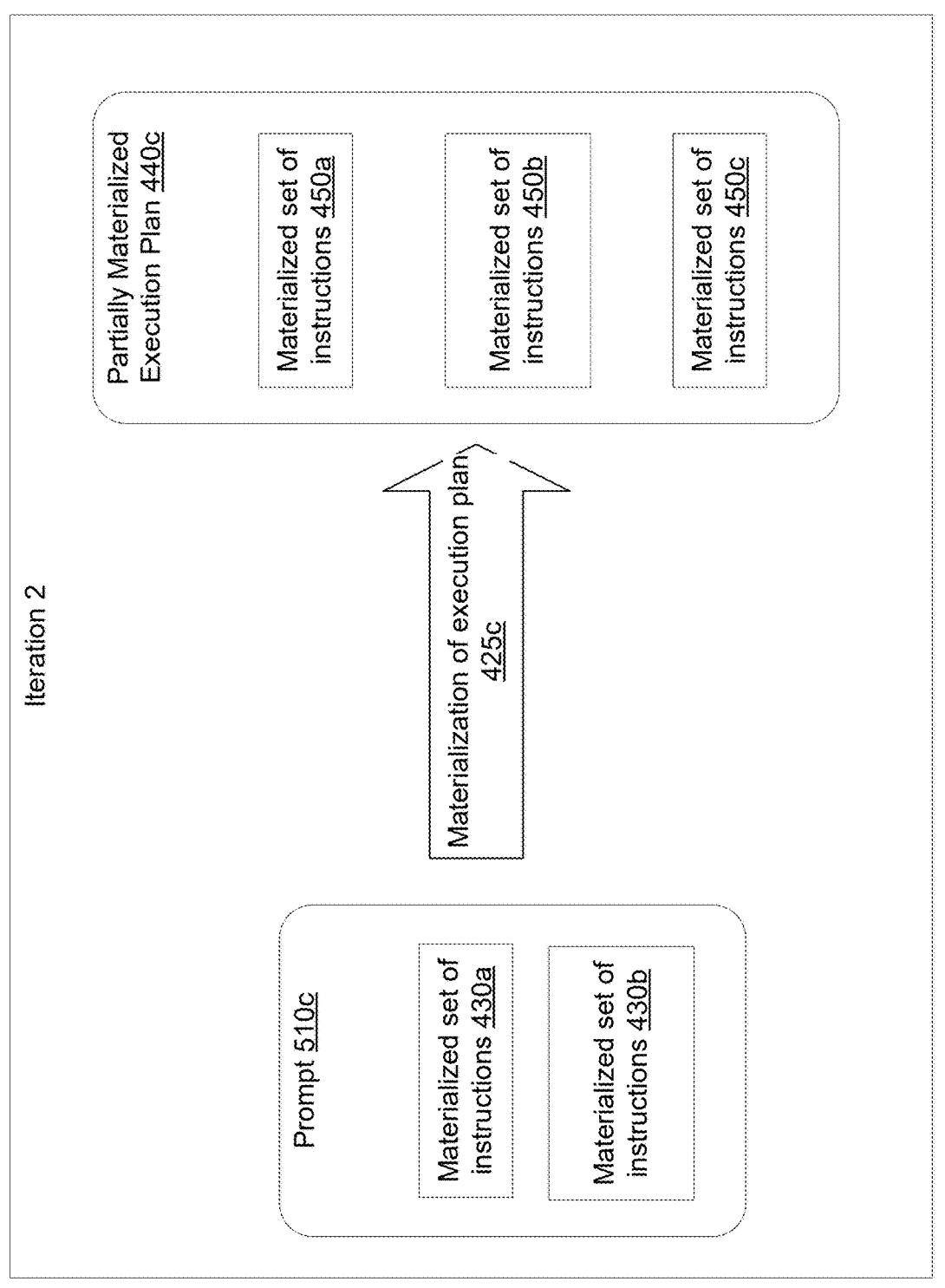
FIG. 5C shows another subsequent iteration of generation of partially materialized execution plan, according to an embodiment.

FIGS. 5A, 5B, and 5C illustrate partial materialization of an execution plan for a natural language data analytics request through iterative refinement, according to an embodiment.

FIG. 5A shows an iteration of generation of partially materialized execution plan, according to an embodiment. The system receives a natural language data analytics request 410 and generates a prompt including the natural language data analytics request. The system identifies a set of instructions to materialize and performs the materialization 425a to generate a partially materialized execution plan 440a that includes a materialized set of instructions 450b.

FIG. 5B shows a subsequent iteration of generation of partially materialized execution plan, according to an embodiment. During this iteration, the system generates a prompt that includes the natural language data analytics request 410 along with the materialized set of instructions 450b. The prompt further includes instructions for the machine learning based language model specifying that the materialized set of instructions 450b should not be modified. The prompt may further describe how to pass parameter values to the materialized set of instructions 450b for interfacing with the remaining instructions of the partially materialized execution plan 440b. The materialization step 425b may add another materialized set of instructions 450a to the partially materialized execution plan 440b.

FIG. 5C shows another subsequent iteration of generation of partially materialized execution plan, according to an embodiment. During this iteration, the system generates a prompt that includes the natural language data analytics request 410 along with all the currently materialized set of instructions including 430a and 430b. The prompt further includes instructions for the machine learning based language model specifying that the materialized set of instructions 450a, 450b should not be modified. The prompt may further describe how to pass parameter values to the materialized set of instructions 450a, 450b for interfacing with the remaining instructions of the partially materialized execution plan 440b. The materialization step 425b may add another materialized set of instructions 450c to the partially materialized execution plan 440c.

FIG. 6 is a flowchart illustrating a process for generating an execution plan for processing a natural language data analytics request, according to an embodiment.

The system receives 600 a natural language data analytics request based on data stored in one or more data stores.

The system generates 610 a partially materialized execution plan for processing the natural language data analytics request using a machine learning based language model. The partially materialized execution plan comprises at least a set of instructions identified as materialized. A materialized set of instructions is unchanged if the partially materialized execution plan was regenerated from the natural language data analytics request using the machine learning based language model.

The system iteratively refines the partially materialized execution plan by repeatedly executing the steps 620 and 630. The system receives 620 an updated natural language data analytics request. The system generates 630 an updated partially materialized execution plan for processing the updated natural language data analytics request. The updated partially materialized execution plan is generated using the machine learning based language model and includes at least an additional set of instructions identified as materialized along with sets of instructions identified as materialized during previous iterations.

The system stores 640 a finalized execution plan obtained by iteratively refining the partially materialized execution plan. The system may execute the finalized execution plan to generate a report that may be displayed via a user interface, for example, a dashboard.

Generating partially materialized execution plans allows the system to display a consistent behavior in spite of use of machine learning based language models that may be non-deterministic. Furthermore, the materialized sets of instructions are reusable across execution plans, thereby allowing code reuse. The materialized sets of instructions represent core computations for an organization and the system uses machine learning based language models to generate documentation for the materialized sets of instructions. This documentation acts as the documentation of the core computations of the organization and codifies the polices of the organization. The system may further generate reports describing whether the materialized sets of instructions conform to policy constraints of the organization or if there are any discrepancies that need to be highlighted and fixed. Determining Exposure of Datasets to Changes in Policy Constraints According to an embodiment, the steps of the execution plan are implemented so as to satisfy certain constraints. The constraints may be specified as policy constraints. For example, an enterprise may have policies that a specific type of analysis is performed using a specific technique or a model. The constraint may specify that the model used for analyzing certain steps may depend on the context. For, the step may be performed using a particular model in one context and another model in a different context. The context may depend on the user performing the analysis, the group within the organization that is performing the analysis, a target system for which the analysis is being performed, and so on. The constraint may be based on resources that are available or resources being used for the analysis. For example, a model that uses lower resources may be preferred for a target system that has fewer computational resources.

Figure 7A:
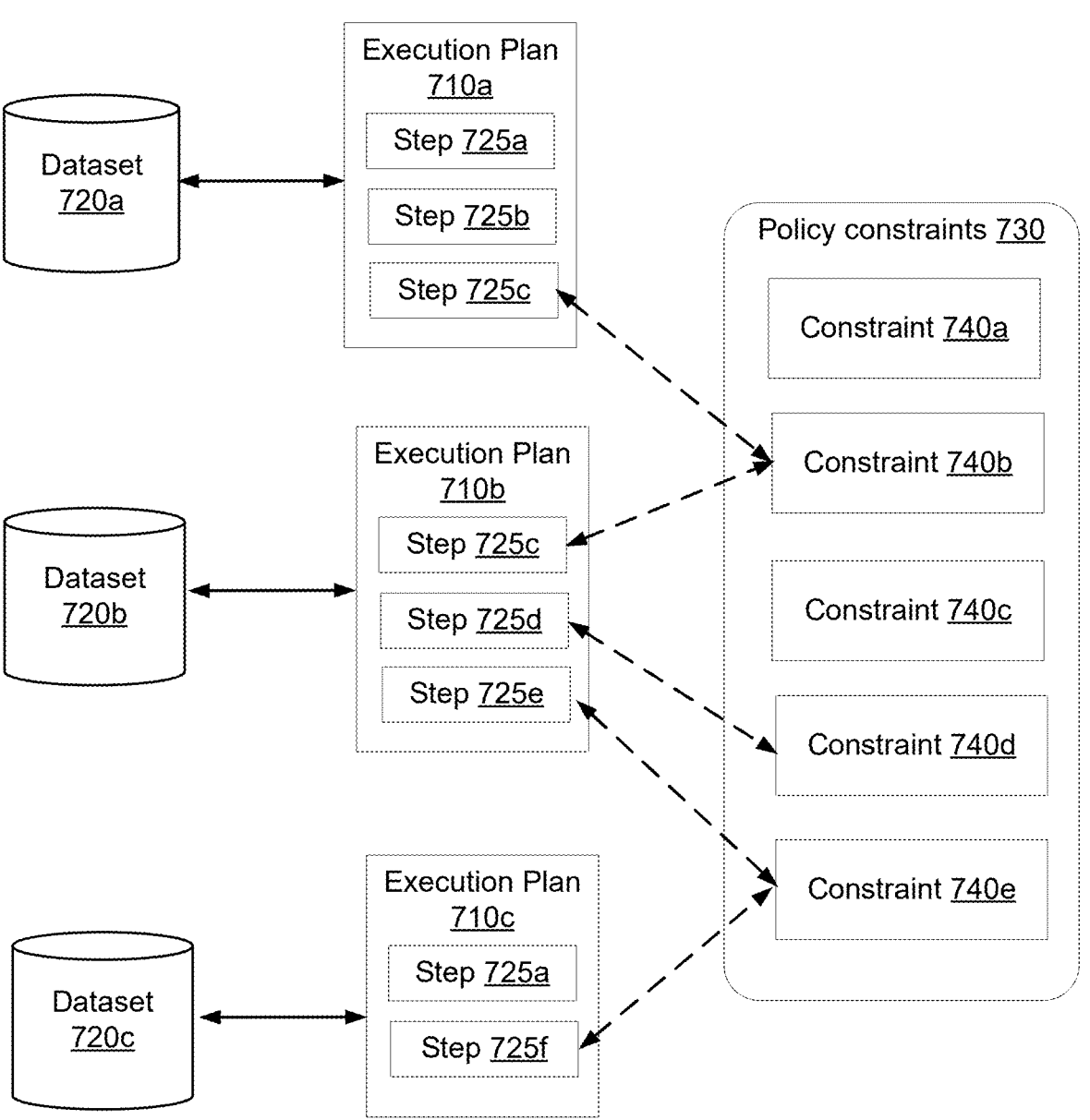
FIG. 7A illustrates the process of determining exposure of datasets to changes in policy constraints, according to an embodiment.

FIG. 7A illustrates the process of determining exposure of datasets to changes in policy constraints, according to an embodiment. FIG. 7A shows datasets 720a, 720b, 720c. Each dataset is generated by executing an execution plan. For example, the datasets 720a, 720b, 720c are generated by executing the execution plans 710a, 710b, and 710c respectively. Each execution plan is generated from a natural language data analysis request. Each plan comprises a set of steps. The set of instructions for a step may be reused across execution plans. For example, execution plan 710a includes steps 725a, 725b, and 725c; execution plan 710b includes steps 725c, 725d, and 725e; and execution plan 710c includes steps 725a, 725f. The instructions for step 725c are shared between execution plans 710a and 710b. Similarly, instructions for step 725a are shared between execution plans 710b and 710c.

The system stores policy constraints 730 including constraints 740a, 740b, 740c, 740d, and 740e. A constraint may be linked to a step of an execution plan if the constraint is applicable to the instructions of the step. As shown in FIG. 7A, constraint 740b is linked to step 725c of execution plan 710a and 710b; constraint 740d is linked to step 725d of execution plan 710b; and constraint 740e is linked to step 725e of execution plan 710b and step 725f of execution plan 710c. A dataset is linked to all the constraints that are linked to the steps of the execution plan used for creating the dataset. For example, dataset 720a is linked to constraint 740b since the constraint 740b is linked to step 725c of execution plan 710a used to create the dataset 720a. Dataset 720b is linked to constraint 740b since the constraint 740b is linked to step 725c of execution plan 710b; dataset 720b is linked to constraint 740d since the constraint 740d is linked to step 725d of execution plan 710b; dataset 720b is also linked to constraint 740e since the constraint 740e is linked to step 725e of execution plan 710b. Dataset 720c is linked to constraint 740e since the constraint 740e is linked to step 725f of execution plan 710c. These links between datasets and constraints can be used to determine the impact of a change in a constraint.

Figure 7B:
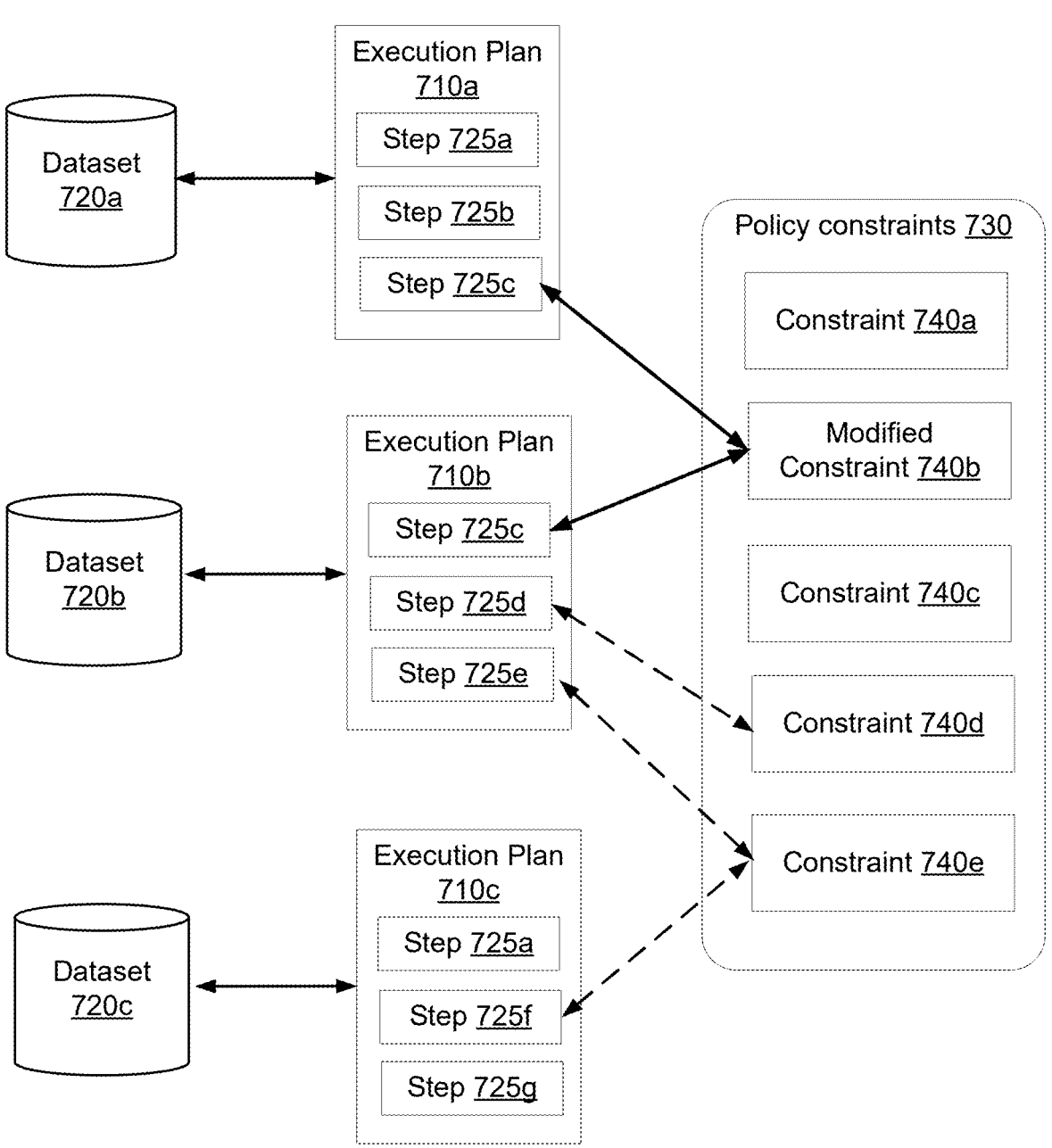
FIG. 7B shows that the constraint is modified or a request for modifying constraint 740*b* is received, according to an embodiment.

FIG. 7B shows that the constraint 740b is modified or a request for modifying constraint 740b is received, according to an embodiment. The constraint 740b is linked to step 725c of execution plans 710a and 710b which are linked to datasets 720a and 720b respectively. Modifying constraints 740b does not have any impact on the dataset 720c. Accordingly, the associations between datasets and constraints allow the system to identify which execution plans need to be regenerated and correspondingly, which datasets need to be rebuilt. This makes the process of modifying constraints efficient since only specific steps of execution plans need to be rebuilt and also only a subset of the dataset may have to be rebuilt. This makes the process of modifying policy constraints computationally efficient.

Figure 8:
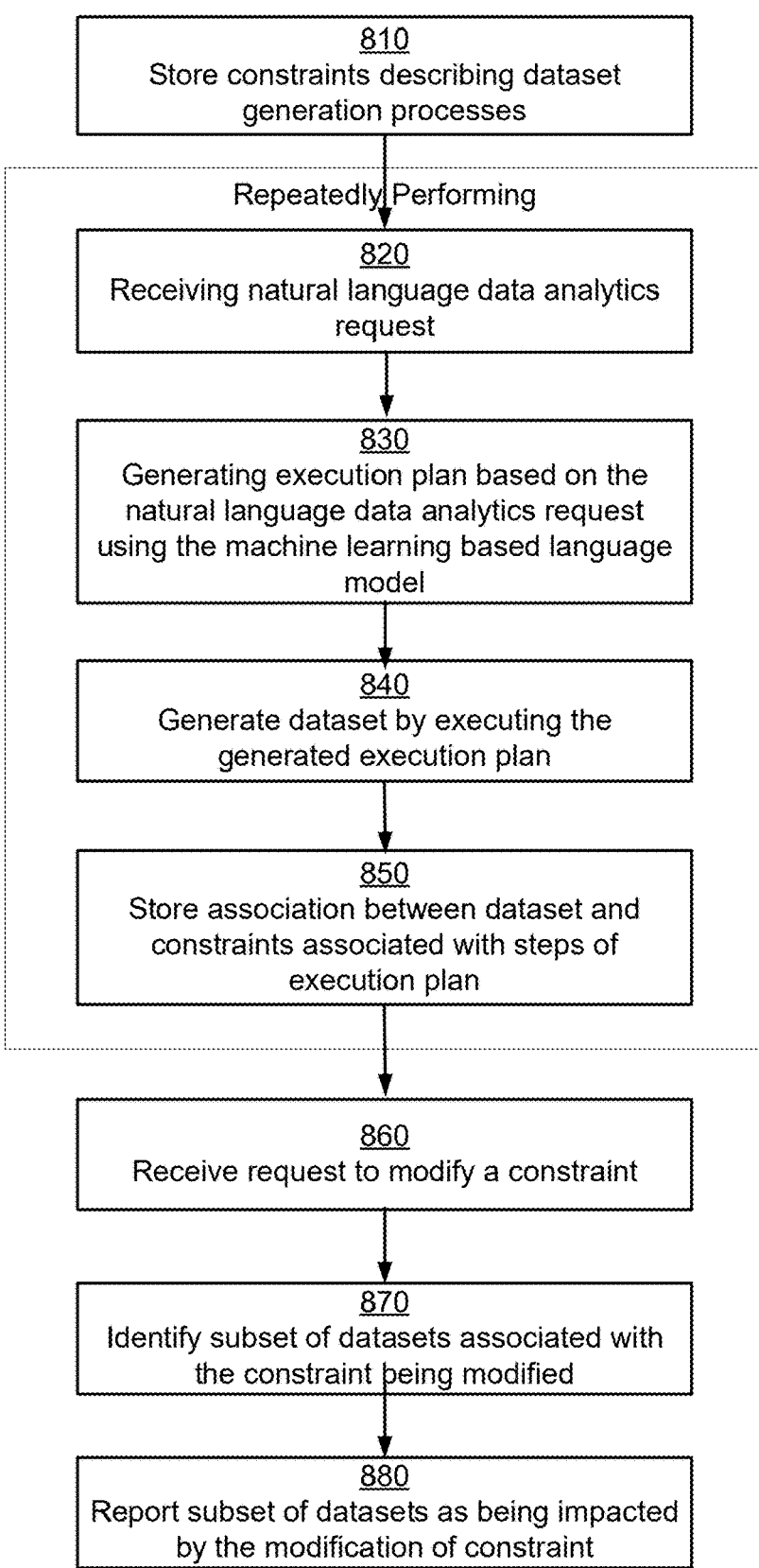
FIG. 8 shows a flowchart illustrating a process of determining exposure of datasets to changes in policy constraints, according to an embodiment.
Figure 9:
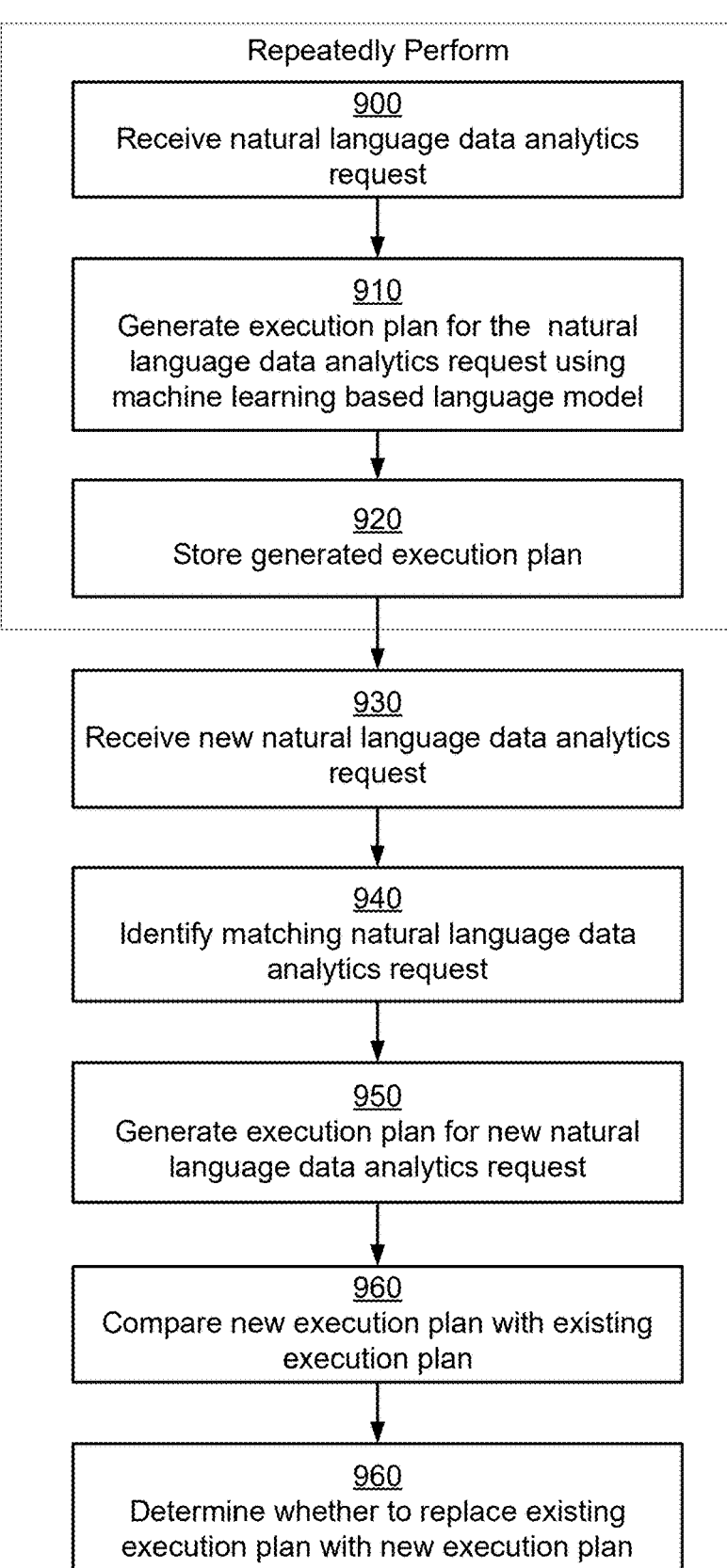
FIG. 9 shows a flowchart illustrating a process of in-context learning for data analytics agents, according to an embodiment.

FIG. 8 shows a flowchart illustrating a process of determining exposure of datasets to changes in policy constraints, according to an embodiment. The steps shown in FIG. 9 are performed by various modules of the online system 200. The steps may be performed in an order different from that indicated herein.

The system stores 810 a set of constraints associated with datasets of an organization. These constraints may represent policies of the organization. A constraint may be referred to as a policy constraint. A set of policy constraints form a policy of the organization. Each constraint may describe a step performed for creating a dataset. For example, a constraint may specify that only a specific type of model may be used for certain analysis steps. As another example, a constraint may specify that a certain type of analysis must be performed using a specific analysis technique or algorithm.

The system generates a plurality of datasets by processing each of a plurality of natural language data analytics requests using steps 820, 830, 840, and 850. The system receives 820 a natural language data analytics request based on data stored in one or more data stores. The system generates 830 an execution plan for processing the natural language data analytics request using a machine learning based language model, the execution plan comprising a set of steps. Each step comprises a set of instructions. One or more steps of the execution plan are associated with a constraint of the set of constraints. For example, if a constraint specifies use of a particular type of technique for a particular type of operation and the step performs that particular type of operation, the system associates the step with the constraint. The system may associate steps with constraints based on user feedback. Alternatively, the system determines that a step should be associated with a constraint based on matching of the description of the step and the description of constraints and confirms with a user whether the association is accurate. If confirmed, the system stores a link describing the association.

The system generates 840 the dataset by executing the execution plan and storing an association between the dataset and the constraint. The system also stores 850 an association between the dataset and constraints associated with steps used the create the dataset.

The system receives 860 a request to replace a constraint with a modified constraint. This step represents a potential policy change of the organization, for example, if a decision is made to use a model M2 instead of model M1 that is currently being used. The system identifies 870 a subset of datasets that are associated with the constraint based on the links between the constraints and the datasets. The system sends information describing the subset of datasets as datasets impacted by modification of the constraint. This information represents the exposure of the datasets to a potential modification to a policy constraint.

If the exposure of the change is large, i.e., the number of impacted datasets is above a threshold, the system may automatically determine not to make the modification of the policy constraint. Alternatively, a user may make the decision and provide the decision to the system by blocking the policy constraint modification.

Alternatively, the system or a user may make a decision to proceed with the policy constraint modification. The system assists with regeneration of the datasets impacted by the change in policy constraint. Accordingly, for each dataset impacted by the modification of the constraint, the system identifies the execution plan used to generate the dataset. The system identifies one or more steps of the execution plan used to generate the datasets that are associated with the constraint. The system regenerates instructions of at least the one or more steps of the execution plan using the machine learning based language model.

In-Context Learning Based Data Analytics Agents

According to an embodiment, the system performs in-context learning to generate data analytics agents for different contexts. For example, an organization, an enterprise, or even an individual user may be a tenant (or a customer) of the online system. The in-context learning may be performed for a tenant or customer of the online system. The in-context learning helps the online system generate execution plans that are specific to the context of a customer. The online system learns from the past analysis performed by users, e.g., employees of an organization to continuously refine and improve execution plans.

According to an embodiment, a data analytics agent is specialized for interacting with a specific type of data source, for example, a relational database or a document database. A data analytics agent may be specialized for a specific domain, for example, a vertical industry. The system simplifies the process of training a data analytics agent via in-context learning. A user, for example, a domain expert may use the system to process several context specific natural language data analytics questions. The system prompts the user for every execution plan being generated.

The user responses guide the system to generate information specific to the data analytics agent including execution plans that are appropriate for a given context. The execution plans and their natural language data analytics equations as well as their instructions or code is stored. A software artifact may be generated based on the information generated for the data analytics agent. The software artifact may be deployed in specific contexts and allows other users to use the context specific data analytics agent.

FIG. 9 shows a flowchart illustrating a process of in-context learning for data analytics agents, according to an embodiment. The steps shown in FIG. 9 are performed by various modules of the online system 200. The steps may be performed in an order different from that indicated herein.

The system performs in-context learning of data analytics agents by generating execution plans for natural language data analytics requests specific to the data agent. A user provides several natural language data analytics requests relevant to the context for which the data analytics agent is being trained. Multiple users may provide feedback during various phases including planning phase, execution phase, and result analysis phase. The planning phase performs generation of an execution plan for natural language data analytics requests. User feedback is obtained to confirm various steps of the execution plan that are generated. Certain steps of the execution plan may be regenerated based on the user feedback. Alternatively certain portions of the execution plan may be determined to be finalized based on user confirmation. The execution phase performs execution of the execution plans of the natural language data analytics requests. User feedback is also provided for result analysis phase. After execution of the execution plan, the system finalizes and presents results. User feedback is obtained for the accuracy of results as well as the presentation of the results. For example, the presentation of the results may be modified based on user feedback. The system may generate a particular type of graph for displaying the results. If the user feedback indicates that the presented graph is inadequate or not preferred by the user, the system may regenerate the results in a different form, for example, a different type of graph or present the results in a different format, for example, in a table form. Once the presentation of result is approved by a user, the system may reuse the same presentation style in similar contexts, for example, for similar reports that may be generated. The system may store a mapping from categories of reports to the types of presentation styles approved by users over time. The system uses the mapping to determine the presentation style for new reports. For example, the system may match a new report with existing reports or categories of reports that were previously finalized. The system identifies the closest matching report and uses the presentation style that was previously used for the matching report or for reports of a matching category. The system may match reports by generating a vector representation of descriptions of reports and performing a vector comparison, for example, based on cosine similarity or certain vector distance metric. The system may generate a vector representation for a description of report based on the natural language description received for generating the report. The system may include information describing the execution plan of the report to generate the vector representation from information describing the report. Explicit feedback provided by users as well as implicit feedback is used for evaluating the new execution plan to determine whether it should replace an existing execution plan.

The system generates a plurality of execution plans by repeating the steps 900, 910, 920 for each of a plurality of natural language data analytics requests. The system receives 900 a natural language data analytics request. The system generates 910 an execution plan for processing the natural language data analytics request using a machine learning based language model. According to an embodiment, the system generates 910 the execution plan by generating a prompt that specifies the natural language data analytics request and requests a machine learning based language model 240 to generate the execution plan for the natural language data analytics request. The system receives a response obtained by executing the machine learning based language model 240 and extracts the execution plan from the response. The system stores 930 the generated execution plan and corresponding sets of instructions in association with the natural language data analytics request.

The system receives 930 a new natural language data analytics request. The system matches the new natural language data analytics request against each of the plurality of natural language data analytics requests to identify 940 a matching natural language data analytics request. According to an embodiment, the system generates vector embeddings for the new natural language data analytics request and compares the vector embeddings against vector embeddings of natural language data analytics requests that were previously processed. The system selects a matching natural language data analytics request based on vector distances between vector embeddings for the new natural language data analytics request vector embeddings of natural language data analytics requests that were previously processed. For example, the system may compare the vector distances with a threshold value to determine whether the two vector embeddings match.

The system generates 950 an execution plan for processing the new natural language data analytics request. The system uses a prompt for requesting the machine learning based language model to generate an execution plan for the new natural language data analytics request. The prompt specifies the new natural language data analytics request and also provides the execution plan of the matching natural language data analytics request for guidance. According to an embodiment, the prompt also specifies the matching natural language data analytics request. According to an embodiment, the prompt also specifies the instructions generated for the execution plan of the matching natural language data analytics request. The additional information helps the machine learning based language model generate the execution plan for the new natural language data analytics request.

It is possible that the new execution plan generated uses techniques that are superior to the execution plan of the matching natural language data analytics request. The system compares the execution plan of the new natural language data analytics request with the execution plan of the matching natural language data analytics request based on feedback received for each execution plan. According to an embodiment, the comparison is based on feedback received by the system for execution of different execution plans.

The system may receive explicit feedback from users. For example, during various steps of generation of execution plan or during execution of the execution plan, the system may present questions to the user and receive feedback based on user responses. The system aggregates feedback across various questions presented to the user and also across multiple users providing feedback.

The system may receive implicit feedback, for example, based on a number of users that execute the execution plan or based on execution efficiency of the execution plan. The system may generate a metric describing the feedback, for example, as a weighted aggregate of different types of feedback received.

The system determines whether to replace the execution plan of the matching natural language data analytics request with the execution plan of the new natural language data analytics request based on the feedback. For example, if the system determines that the new execution plan is superior, the system may replace an existing execution plan of a matching new natural language data analytics request with the new execution plan. According to an embodiment, the system replaces the existing execution plan by regenerating the existing execution plan using a prompt that provides the existing natural language data analytics request and the new execution plan and request the machine learning language model to generate an execution plan for the existing natural language data analytics request using the new execution plan for guidance.

According to an embodiment, the system executes the execution plan of the new natural language data analytics request to generate a report and sends the report for displaying via a user interface. According to an embodiment, the user interface for displaying the report is a dashboard. The system may execute the execution plan of the new natural language data analytics request to generate a report and sending the report for displaying via a user interface are performed based on a predetermined schedule for displaying the report on the dashboard.

According to an embodiment, the execution plan of the new natural language data analytics request incorporates one or more sets of instructions from the execution plan of the matching natural language data analytics request. Each of the one or more sets of instructions is marked as materialized.

Causation Analysis of Anomalies in Metrics Determined by Data Analytics

In accordance with one or more aspects, a system, for example, an online system performs causation analysis of signals using machine learning based language models, for example, large language models (LLMs).

The system identifies a signal based on data obtained from one or more data sources. The system generates an execution plan for determining signal values of the signal based on data obtained from one or more data sources. The system repeatedly executes the execution plan for generating signal values. The system determines whether a current signal value represents an anomaly. If the current signal value represents an anomaly, the system performs causation analysis of the anomaly, using a machine learning based language model. The system performs an action based on the cause of the anomaly, for example, by transmitting information describing the set of data values, or fetching additional data intelligently from other systems—typically which store more fine-grained data to perform further analysis. The system finds curates and harmonizes fine-grained data from various data sources to find the underlying root cause for anomaly.

According to various embodiments, the system performs causation analysis of the anomaly using a machine learning-based language model and initiates multiple concurrent causation analyses to explore different potential causes in parallel. The system may perform multiple such causation analysis concurrently tracing different signals. The system may abandon a path if subsequent signals indicate that the likelihood of that cause is weak.

According to an embodiment, the system determines whether the current signal value represents an anomaly based on the comparison by performing the following steps. The system determines a delta signal value representing a change in signal value determined based on the current signal value. The system compares the delta signal value with a threshold value and determines that the current signal value represents an anomaly if the delta signal value exceeds the threshold value.

According to an embodiment, the threshold value is a first threshold value associated with a first context associated with the signal, and the system determines a second threshold value for a second context associated with the signal.

According to an embodiment, a context associated with the signal is determined based on one or more of: a location associated with the signal, a time associated with the signal; or one or more users associated with the signal.

According to an embodiment, the system identifies an entity associated with the set of data values identified as a cause of the anomaly. The entity represents: one or more users, one or more systems, one or more sensors generating sensor data. The system performs an action associated with the entity, wherein the action represents one of: sending a message to a user associated with the entity, or taking a remedial action for preventing the anomaly.

The system, according to an embodiment, uses machine learning based language models to generate signal values based on analytics of data stored in one or more data stores, for example, data generated by an enterprise. The signals may represent metrics generated from data. A signal may also be referred to herein as a metric or a KPI (key performance index). A signal value may also be referred to herein as a metric value or a KPI value. The signal values may be generated periodically, for example, on a daily, weekly, or monthly basis. The system analyzes the signals to determine whether there is a change in values of a signal that is anomalous and needs further analysis. The system determines thresholds for different signals so that a change greater than a related threshold is considered an anomaly and selected for further analysis. The system performs causation analysis to determine a root cause of the anomalous change. Accordingly, the system determines data stored in the data stores or other signals associated with the anomalous signals that indicate a cause of the anomaly. The system takes action determined based on the root cause, for example, by automatically reporting the root cause to a user or taking remedial action to modify the signal value to remove the anomaly. For example, if the anomaly indicates that a change in the signal value is higher than a threshold value, the system takes remedial actions to decrease the signal value. The change in signal value may be caused by the signal increasing or the signal decreasing.

According to an embodiment, the system receives information identifying a signal for computing and one or more examples of computation of the signal values. The system processes declarative specification for computing the signal values since the specification describes what signal to generate, without providing specific instructions for computing the signal values. The system generates a prompt describing the signal and the examples and sends the prompt for execution to a machine learning based language model with a request to generate an execution plan for computing the signal value based on data obtained from the data sources. The system receives a response obtained by executing the machine learning based language model and extracts the execution plan from the response. The system stores the execution plan in a data store and subsequently invokes the stored execution plan. Storing the execution plan and invoking the stored execution plan subsequently improves the efficiency of execution of the instructions for determining the signal value since the system does not need to execute the machine learning based language model every time the signal value is determined. Furthermore, the system generates deterministic results since the stored execution plan is fixed and does not change from one invocation to another. In contrast, invoking the machine learning based language model to generate the execution plan multiple times may result in non-deterministic results since the machine learning based language model may be non-deterministic and generate different execution plans when the machine learning based language model is invoked multiple times.

The system automatically determines whether an anomaly is present. If the system determines that an anomaly is present in the signal value, the system sends message to one or more users indicating the root cause of the anomaly. This process improves the utilization of computational resources compared to conventional dashboards that require users to continuously check for anomalies and request causation analysis if the user identifies an anomaly. An anomaly is expected to occur very infrequently. As a result, a dashboard-based system may require the user to check every possible signal value that is generated by retrieving the results and displaying them on a user interface, thereby consuming computational and network resources. In contrast, the system according to various embodiments, sends the result only when an anomaly is detected, thereby improving the resource utilization of computational and network resources required for transmitting and displaying the signal data.

Figure 10:
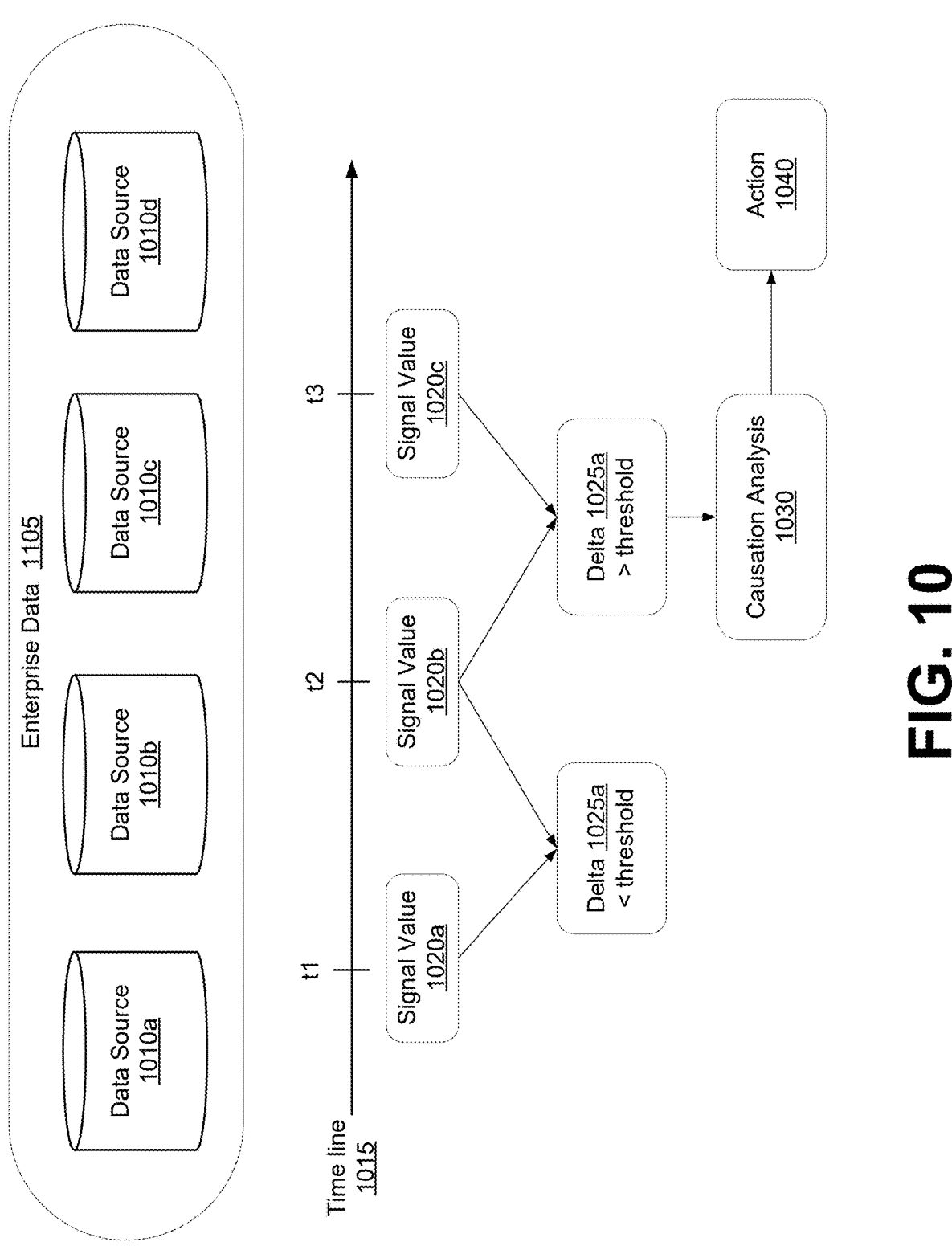
FIG. 10 shows the overall process of performing causation analysis of anomalies in metrics determined by data analytics, according to an embodiment.

FIG. 10 shows the overall process of performing causation analysis of anomalies in signals, according to an embodiment. The system processes data stored in a set of data sources 1010$a$, 1010$b$, 1010$c$, 1010$d$, and so on. The data sources 1010 may store user data, system logs, even data, data generated from systems that are instrumented, sensor data and so on. The system determines values of one or more signals on a periodic basis, for example, daily, weekly, monthly, or based on a predetermined schedule. The timeline 1015 shows various times at which the signal value is determined. For example, signal value 1020$a$ is determined at time t1, signal value 1020$b$ is determined at time t2, and signal value 1020$c$ is determined at time t3. The system analyzes the various signal values to determine whether a particular signal value is anomalous. For example, the system may compare a current signal value with a previously generated signal value to determine the difference between the two signal values. If the signal value changes by more than a threshold value, the system determines that the current signal value represents an anomaly. For example, as illustrated in FIG. 10, the difference delta 1025$a$ between the signal values 1020$b$ and 1020$a$ is less than the threshold value. Therefore, the signal value 1020$b$ is not an anomaly and does not need further analysis. However, the system determines that the difference delta 1025$b$ between the signal values 1020$c$ and 1020$b$ is greater than the threshold value. Therefore, the signal value 1020$c$ is determined to be an anomaly that needs further analysis. Accordingly, the system performs causation analysis 1030 of the anomalous signal value 1020$c$ to determine a root cause of the anomaly. The system takes an action based on the root cause, for example, by notifying a user of the occurrence of the anomaly or by automatically taking a corrective action to remedy the anomaly. The system accordingly improves the user interaction with the user compared to systems that require user to initiate the analysis and pull results. A system that requires user to initiate the analysis provides poor user experience since the user may have to initiate the analysis multiple times even if there are no anomalies. Furthermore, such a traditional system is inefficient since the it requires additional network communications and processing for the user interactions. In contrast the system as disclosed provides better user experience since the user is informed of the anomalies only when such anomalies are automatically detected, thereby reducing the number of user interactions required. Furthermore, the system as disclosed improves the utilization of system resources such as processing resources and network resources since there are fewer interactions with the user, thereby improving the resource utilization and improving the computational efficiency of the system compared to traditional systems.

FIG. 11 illustrates the system architecture of a causation analysis module, according to an embodiment. The causation analysis module 270 includes a scheduler 1110, an anomaly detection module 1120, a root cause determination module 1130, and a threshold determination module 1140. Other embodiments may include more or fewer modules than those indicated herein. The modules may be executed by different processes in a distributed system. For example, the threshold determination module 1140 may be executed on a system different from the system executing the scheduler 1110. According to various embodiments system performs ambient analysis that includes causation analysis as well as other types of analysis such as trend analysis, forecasting of results, and so on and automatically provides information to the user or takes remedial actions based on the forecast. For example, the system may generate necessary reports and provide to the appropriate users, the system may automatically identify the appropriate users to notify based on the root cause analysis, the system may schedule meetings or tasks on users calendars based on a scheduling application such as a calendar.

The scheduler 1110 schedules execution of instructions to compute values of the signals. The scheduler 1110 may create a schedule on a periodic basis, for example, every day, every week, every month, and so on. Alternatively, the scheduler 1110 may create a predetermined schedule that can execute the instructions to compute values of the signals based on user input. The system may save execution plans of instructions to compute the signals and execute the saved execution plan.

The anomaly detection module 1120 detects anomalies in signal values. According to an embodiment, the anomaly detection module 1120 compares values of signals across time intervals, for example, two signal values that were evaluated in consecutive time intervals. For example, the anomaly detection module 1120 may compare a current signal value determined during the current time intervale with a previous signal value determined in the previous time interval to determine a delta signal value representing a change in the signal value over a time interval. The anomaly detection module 1120 compares the difference in signal values with a threshold value to determine size of the change in the signal value over a time interval. If the change (i.e., delta of signal value) is greater than the threshold value, the anomaly detection module 1120 determines that there is an anomaly in the signal values that needs further analysis. For example, the anomaly detection module 1120 may identify the current signal value as anomalous and request the root cause determination module 1130 to perform causation analysis based on the current signal value to determine a root cause of the anomaly.

The root cause determination module 1130 performs analysis of anomalous signal values to determine a cause of the anomaly. The root cause determination module 1130 may identify specific data values that are associated with the signal value that represent the cause of the anomaly. A data value may also be referred to herein as a data component. A change in data values used to determine the signal value may be identified as the root cause of the anomaly. Alternatively, or in addition, the root cause determination module 1130 may identify an entity as the root cause of the anomaly, for example, a user, a project representing a set of related tasks performed by users in an organization, a region or a location associated with the anomaly, and so on as the cause of the anomaly. For example, the root cause determination module 1130 may report that actions of a particular user or group of users, i.e., a team resulted in the anomaly. For signals associated with systems, the root cause determination module 1130 may identify a specific system or a set of systems as root cause of the anomaly.

According to an embodiment, the system identifies the entity by generating a prompt identifying the root cause identified for the anomaly and requesting a machine learning based language model to identify an entity associated with the root cause. The prompt may specify a set of examples of entities determined to be associated with root causes of anomalies previously identified. The system sends the prompt to the machine learning based language model for execution. The system receives the response generated by the machine learning based language model and extracts the entity from the response.

The threshold determination module 1140 adjusts the values of the thresholds used for determining anomalies. The thresholds represent values against with changes in signal values are compared to determine whether the change is significant enough to be considered an anomaly. The system may determine multiple thresholds for a particular signal. The system may identify multiple contexts and determine a threshold for each context. A context may be based on attributes such as time, location, products, and so on. Accordingly different threshold values may be determined for different time periods, for example, different seasons, different locations, for example, different geographical regions, or different products, for example, different thresholds for different products or items offered by an enterprise.

The system may determine different contexts for different times of the year or different seasons, for example, a particular threshold value for holiday seasons and a different threshold value for other periods of the year. The system may determine different thresholds for different regions or geographical locations, for example, a particular threshold value for a region R1 (e.g., California) and a different threshold for another region R2 (e.g., New York.) The system may determine different thresholds for different groups of systems, for example, different thresholds for two different networks of systems or for two different subnets of systems. The system may determine different thresholds for different groups of sensors, for example, different thresholds for two different facilities using sensors to monitor equipment. The system may determine different thresholds for different types of equipment being monitored, for example, different thresholds for heating equipment vs. refrigeration equipment. The threshold for a particular context for determining anomalies may be automatically determined by the system by monitoring a current trend of the data and an amount of deviation from the current trend. For example, if the system detects more than a threshold amount of deviation from the current trend, the system may determine that the deviation represents an anomaly and triggers causation analysis. According to an embodiment, the system receives the threshold values from a user. The system may make a recommendation of a threshold value and present to user via a user interface to either receive an approval of the threshold value or a modified threshold value based on user feedback.

Figure 12:
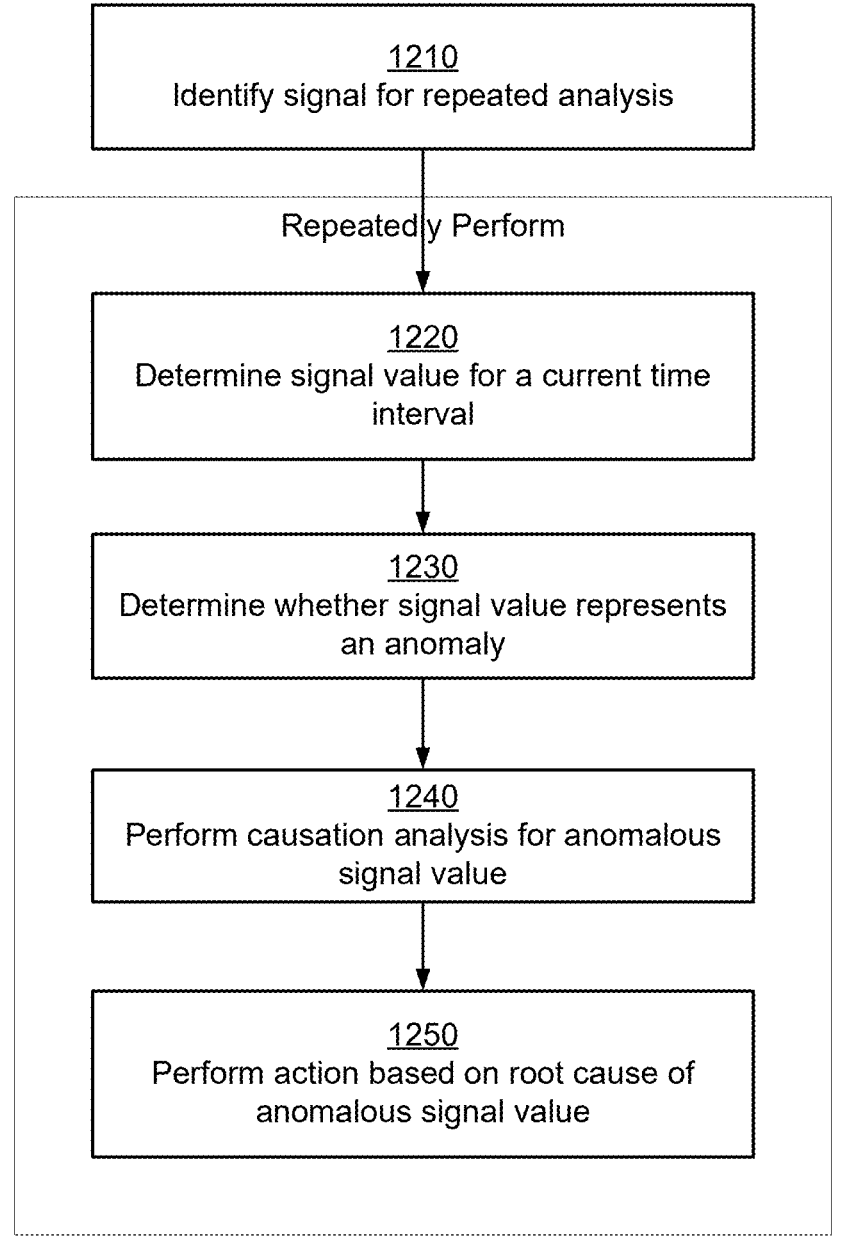
FIG. 12 is a flowchart illustrating the overall process for determining anomalies in signals and analyzing them, according to an embodiment.

FIG. 12 is a flowchart illustrating the overall process for determining anomalies in signals and analyzing them, according to an embodiment. The process may be executed by modules of a system, for example, the causation analysis module 270 of the online system 200. The steps may be executed in an order different from that indicated herein. For example, certain steps may be performed in parallel.

The causation analysis module 270 identifies a signal for generating the value on a repeated basis, for example, periodically. For example, the signal may be specified by a user via a user interface. The system may also receive a schedule from a user via a user interface indicating when to repeat the generation of the signal value. According to an embodiment, the system receives a natural language request specifying the signal and the schedule and generates an execution plan for generating the signal value. The system repeatedly executes the execution plan based on the schedule to repeatedly generate the signal value.

The causation analysis module 270 repeatedly performs the steps 1220, 1230, 1240, 1250. The system determines 1220 the signal value for a current time interval. The system may generate an execution plan and execute it to determine the signal value or execute a stored execution plan for determining the signal value.

The causation analysis module 270 determines 1230 whether the signal value determined for the current time interval represents an anomaly. The causation analysis module 270 determines 1230 whether the signal value determined for the current time interval represents an anomaly by comparing the signal value V1 for the current time interval with the signal value V2 for a previous time interval, for example, the time interval immediately preceding the current time interval. The system determines the difference in the two signal values V1-V2 as the delta signal value. The system compares the difference between the signal values, i.e., the delta signal value with a threshold value and determines whether the value V1 is an anomaly based on the delta signal value. For example, if the delta signal value is greater than a threshold value, the system may determine that the value V1 represents an anomaly and if the delta signal value is below the threshold value, the system may determine that the value V1 does not represent an anomaly.

If the system determines that the signal value V1 is not an anomaly, the system may not perform further analysis of the signal value V1. If the system determines that the signal value V1 is an anomaly, the system may perform further analysis of the signal value V1. According to an embodiment, the system presents the signal value to a user via a user interface and receives instructions from the user via the user interface indicating whether the system should perform further analysis of the signal value V1. Accordingly, the system performs 1240 causation analysis for the signal value V1 to determine a root cause of the occurrence of the anomaly.

The system may perform 1250 an action based on the root cause of the anomalous signal value. The action may represent sending a message or a notification to a user with information describing the root cause of the anomaly. The action may represent a remedial action for improving the signal value during a subsequent time interval to avoid the anomaly.

The flowchart of FIG. 12 illustrates determining anomalies for signal values determined on an ongoing basis such that the latest signal value is evaluated for determining whether the signal value is anomalous. In other embodiments, the system receives a sequence of signal values that were previously determined and analyzes them to identify which signal values represent anomalies.

Figure 13:
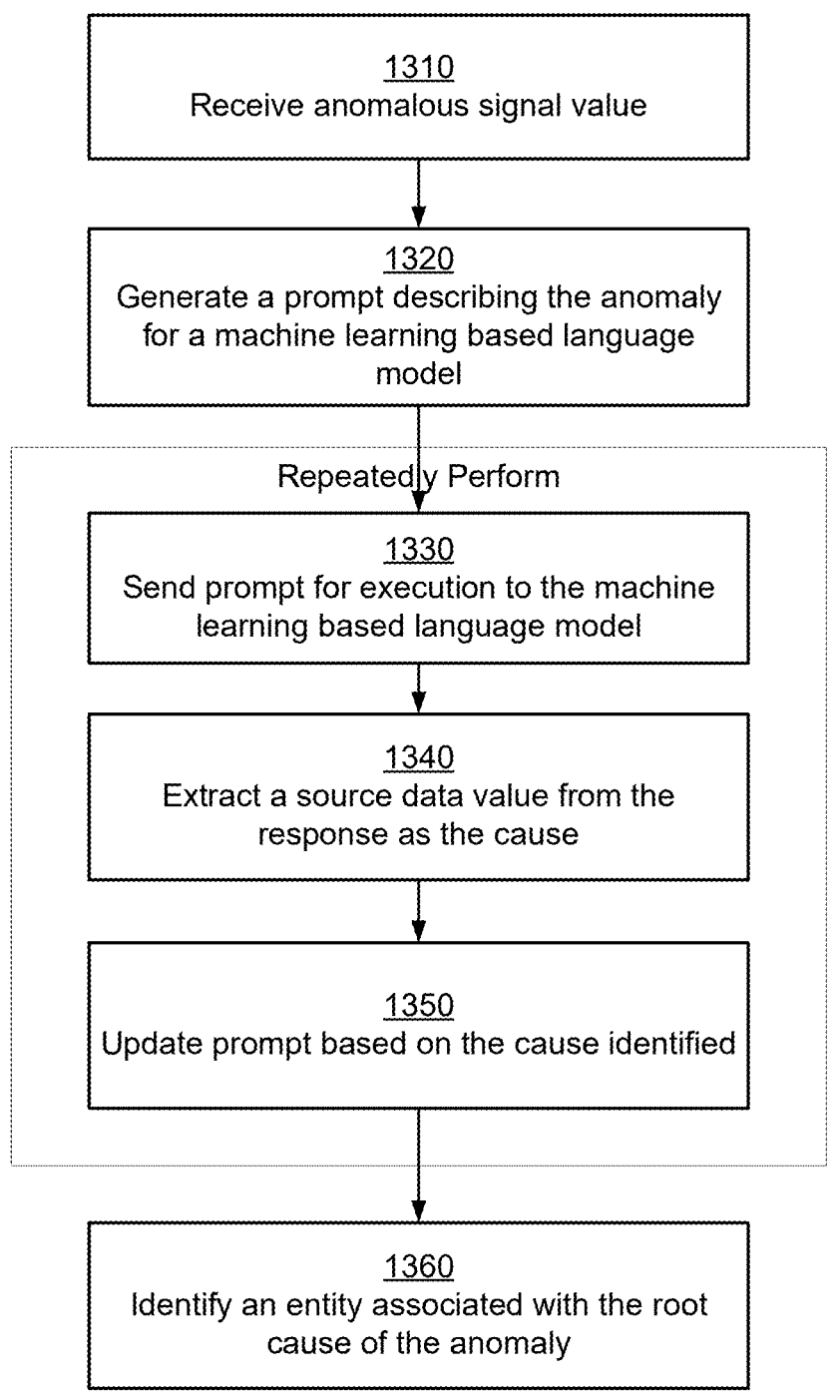
FIG. 13 is a flowchart illustrating a process for performing causation analysis of an anomaly in a signal, according to an embodiment.

FIG. 13 is a flowchart illustrating a process for performing causation analysis of an anomaly in a signals, according to an embodiment. The process may be executed by modules of a system, for example, the causation analysis module 270 of the online system 200. The steps may be executed in an order different from that indicated herein. For example, certain steps may be performed in parallel. The process indicated in FIG. 13 may be invoked by the process illustrated in FIG. 12, for example, by step 1240 that performs causation analysis of the anomalous signal value.

The causation analysis module 270 receives 1310 an anomalous signal value determined by the steps of process illustrated in FIG. 12. The causation analysis module 270 generates 1320 a prompt for the machine learning based language model describing the anomaly. The prompt may describe the signal being analyzed, one or more signal values associated with the anomaly, and any relevant information such as the time values associated with the signal values, and so on. According to an embodiment, the causation analysis module 270 includes in the prompt one or more examples of anomalies and corresponding signals or data values determined as the cause of the anomaly. These examples may be provided by users or extracted from logs such as event logs or application logs that store such information. According to an embodiment, the system stores the examples in a database and improves the prompt with additional examples over time. For example, the system may select a set of examples that illustrate a variety of data by covering different types of anomalies and different types of root causes.

The system repeatedly performs the steps 1330, 1340, 1350. The causation analysis module 270 sends 1330 the prompt to the machine learning based language model for execution. The machine learning based language model processes the prompt to generate a response. The causation analysis module 270 receives 1340 the response generated by the machine learning based language model and extracts 1350 a cause C1 identified by the machine learning based language model.

The cause may be represented as a sequence of tokens or a string, for example, a natural language description of the cause. A cause may represent one or more of a particular event associated with the system, a set of transactions performed by the system, a change in another signal that is associated with the signal showing the anomaly, and so on.

The system updates the prompt based on the cause C1 so that the next iteration of the process identifies a cause C2 of the cause C1. The system may remove the previous cause and add the new cause for analysis or may add the new cause so that the prompt describes all previous causes determined in previous iterations as well as the anomaly. For example, the prompt may describe the anomaly, a cause C1 identified by the machine learning based language model as the cause of the anomaly, a cause C2 identified by the machine learning based language model as the cause of C1, a cause C3 identified by the machine learning based language model as the cause of C2, and so on. Alternatively a prompt may simply identify a prompt or a particular cause identified by the previous iteration. For example, the prompt P1 of the first iteration identifies the anomaly, the prompt P2 of the second iteration identifies the cause C1 identified by the first iteration, the prompt P3 of the third iteration identifies the cause C2 identified by the second iteration, the prompt P3 of the first iteration identifies the cause C3 identified by the third iteration, and so on.

Accordingly, the system repeats the steps 1330, 1340, 1350, 1360 multiple times to identify a root cause of the anomaly. According to an embodiment, the causation analysis module 270 executes the process for a fixed set of iterations, for example, 5 iterations. According to an embodiment, the system determines the number of iterations based on the domain for which the anomaly is being determined. According to an embodiment, the system is configured to have a predetermined maximum number of iterations of causation analysis, for example, 5 iterations. However the system is configurable and allows configuration to any arbitrary number of iterations. According, to an embodiment, the system determines when to stop iterating dynamically. For example, the system may stop performing deeper root cause analysis at a particular iteration based on whether the system has determined the root cause or not or if whether the system can or cannot proceed because of lack of data. According to an embodiment, the system analyzes after each iteration, whether to continue deeper root cause analysis or stop. The system generates a structured query input, for example, a prompt for a machine learning based language model to determine whether the root cause has already been determined and/or whether there is information or data available to perform further analysis. The system receives the response obtained by executing the machine learning based language model and analyzes the response to determine whether there is data available for further root cause analysis and a likelihood that the root cause has already been determined. The system determines whether to perform deeper root cause analysis based on the response and analysis of the response. For example, if the system determines based on the response that the root cause has not been determined and/or there is additional data that can be analyzed to determine the root cause, the system performs another iteration of causation analysis.

According to an embodiment, once the system determines a cause in an iteration of FIG. 13, the system determines whether to proceed with the next iteration. The system determines whether the data available in the set of data sources considered for analysis includes information useful for further in-depth causation analysis. According to an embodiment, the system generates a structured query input representing a prompt for a machine learning based language model describing a set of data sources and requesting the machine learning based language model to determine whether a further in-depth analysis based on these data sources would provide additional causation information. The prompt may further request the machine learning based language model to identify additional data sources that may include information useful for further in-depth causation analysis of the anomaly. The response generated by the machine learning based language model may identify one or more existing data sources as including information useful for further in-depth causation analysis or identify one or more new data sources for use for further causation analysis. The machine learning based language model may identify the type of information that may be useful for further information. The system or a user may perform either internet search or an enterprise wide search for additional data sources that may store the required information. If the machine learning based language model identifies additional data sources for use for further causation analysis, the system proceeds with the next iteration of the causation analysis. If the machine learning based language model does not identify any existing data source or new data source as including information that may be relevant for further causation analysis, the system may stop the iterations of the causation analysis performed by FIG. 13 and proceed with the next step 1360.

According to an embodiment, the causation analysis module 270 further identifies 1360 an entity associated with the root cause of the anomaly. For example, the entity may be a user or a user account associated with the root cause, such as a user performing tasks associated with the signal being analyzed. For example, if the signals being analyzed represent one or more metrics based on transactions of an enterprise, the system may identify a user or a user account associated with a user that performed the transactions as the entity associated with the root cause. Alternatively, the system may identify a location, for example, a geographical location associated with the root cause as the entity. For example, a particular region associated with the transactions such as sales may be causing a decrease or increase in a metric such as revenue or profit of the enterprise. As another example, if the signal being analyzed represents instrumentation data obtained in a data stream from a set of computer systems being monitored, the system may identify a particular computer system or a process executing on a computer system as the entity associated with the root cause. As another example, if the signal being analyzed represents sensor data obtained in a data stream from a set of appliances being monitored, the system may identify a particular appliance that sent the sensor data as the entity associated with the root cause.

Figure 14:
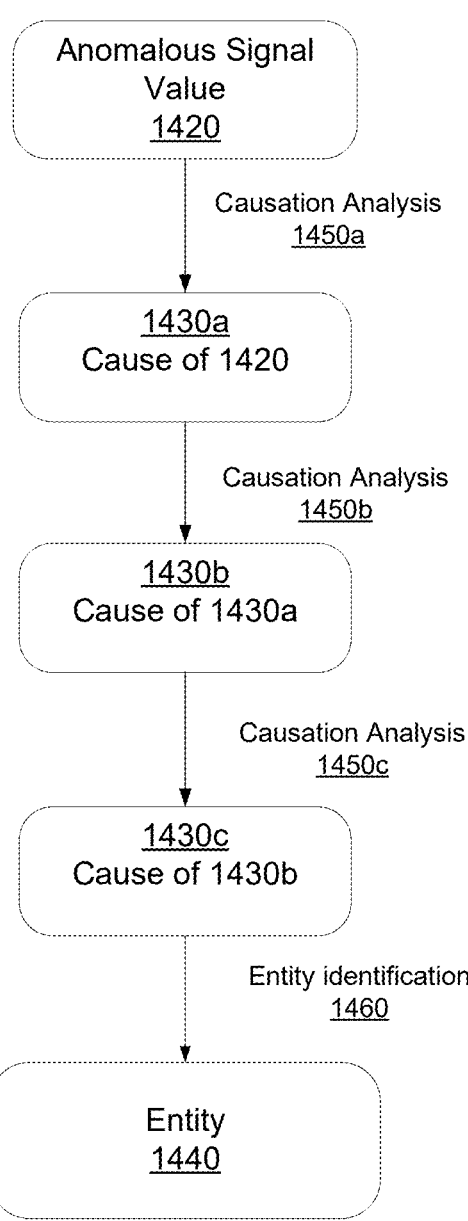
FIG. 14 illustrates the process for performing causation analysis of an anomaly in a signal generated from data, according to an embodiment.

FIG. 14 illustrates the causation analysis of an anomaly in a signal using examples, according to an embodiment. The system performs causation analysis of signal value 1420 that is determined as an anomaly. The causation analysis module 270 performs a first iteration of causation analysis 1450a using a machine learning based language model to determine that a cause 1430a of the anomaly in signal value 1420. The causation analysis module 270 further performs a second iteration of causation analysis 1450b to determine the cause of 1430a which represents the cause determined by the first iteration. The causation analysis module 270 further performs causation analysis 1450c to determine the cause of the 1430b which represents the cause determined by the second iteration. The causation analysis module 270 further identifies 1460 an entity 1440 associated with the cause 1430c and therefore responsible for causing the anomaly 1420 of the signal value.

FIGS. 15A-15G present screens shots of user interfaces illustrating user interactions with a system performing the causation analysis described herein. These user interfaces are configured by the system and may be sent for presentation to a user via an application running on a client devices, for example, a browser.

FIG. 15A shows a screenshot of a user interface for receiving information describing a signal and a schedule for executing the signal, according to an embodiment. The user interface includes a widget 1505, for example, a text box for receiving a natural language text input specifying the type of signal to compute and information describing the schedule for computing the signal. FIG. 15A identifies the working capital as the signal and repeating the computation every quarter as the schedule.

Figure 15B:
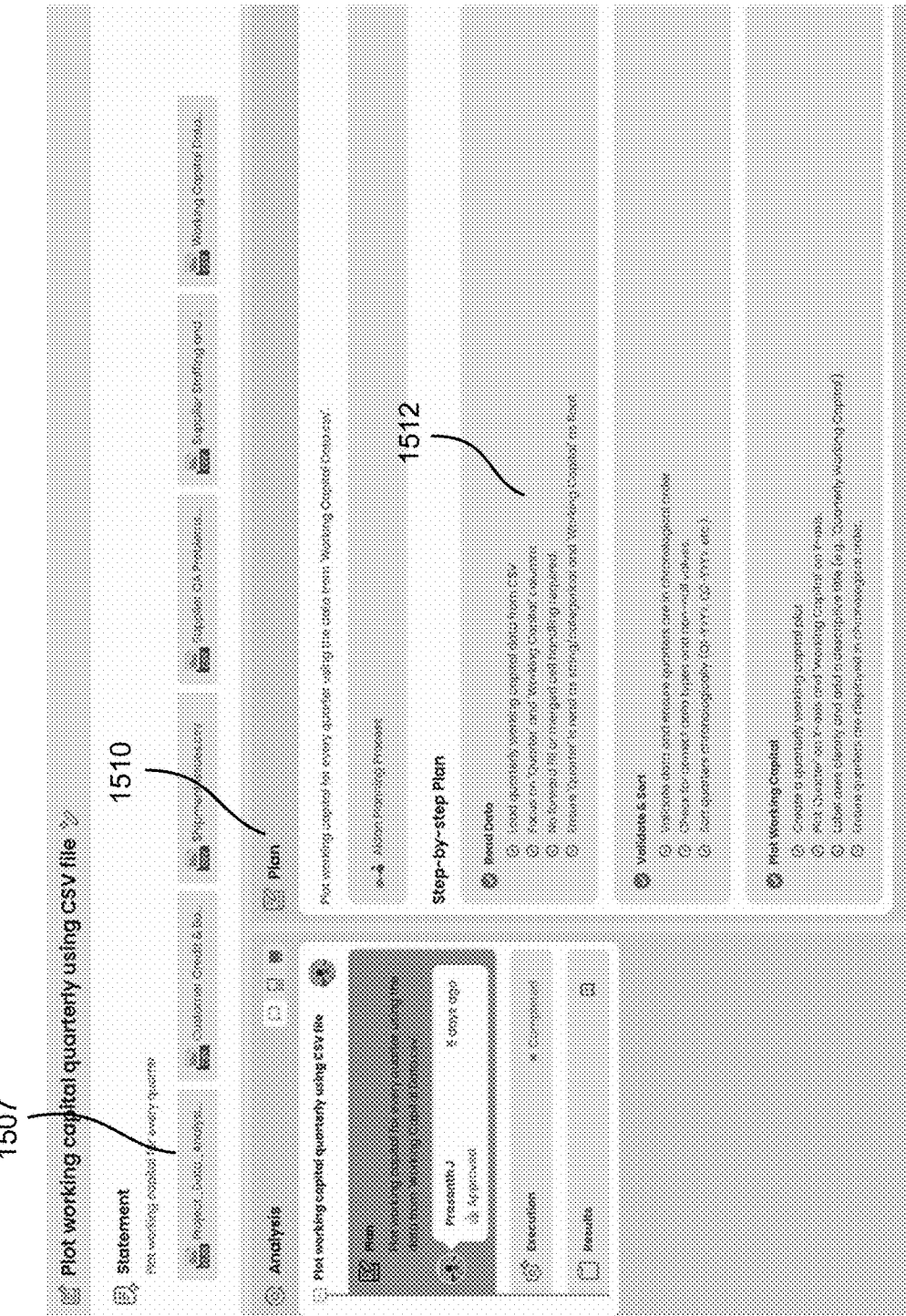
FIG. 15B shows a screenshot of a user interface displaying generation of execution plan for the signal, according to an embodiment.

FIG. 15B shows a screenshot of a user interface displaying generation of execution plan for the signal, according to an embodiment. The user interface displays various data sources 1507 used for obtaining data for processing the signal. The system generates an execution plan for computing the signal and displays the execution plan 1510. The execution plan may comprise a sequence of steps 1512 such as reading data from the data sources, performing various types of processing of the data such as validating and sorting, and determining the requested signal and plotting charts displaying the values.

Figure 15C:
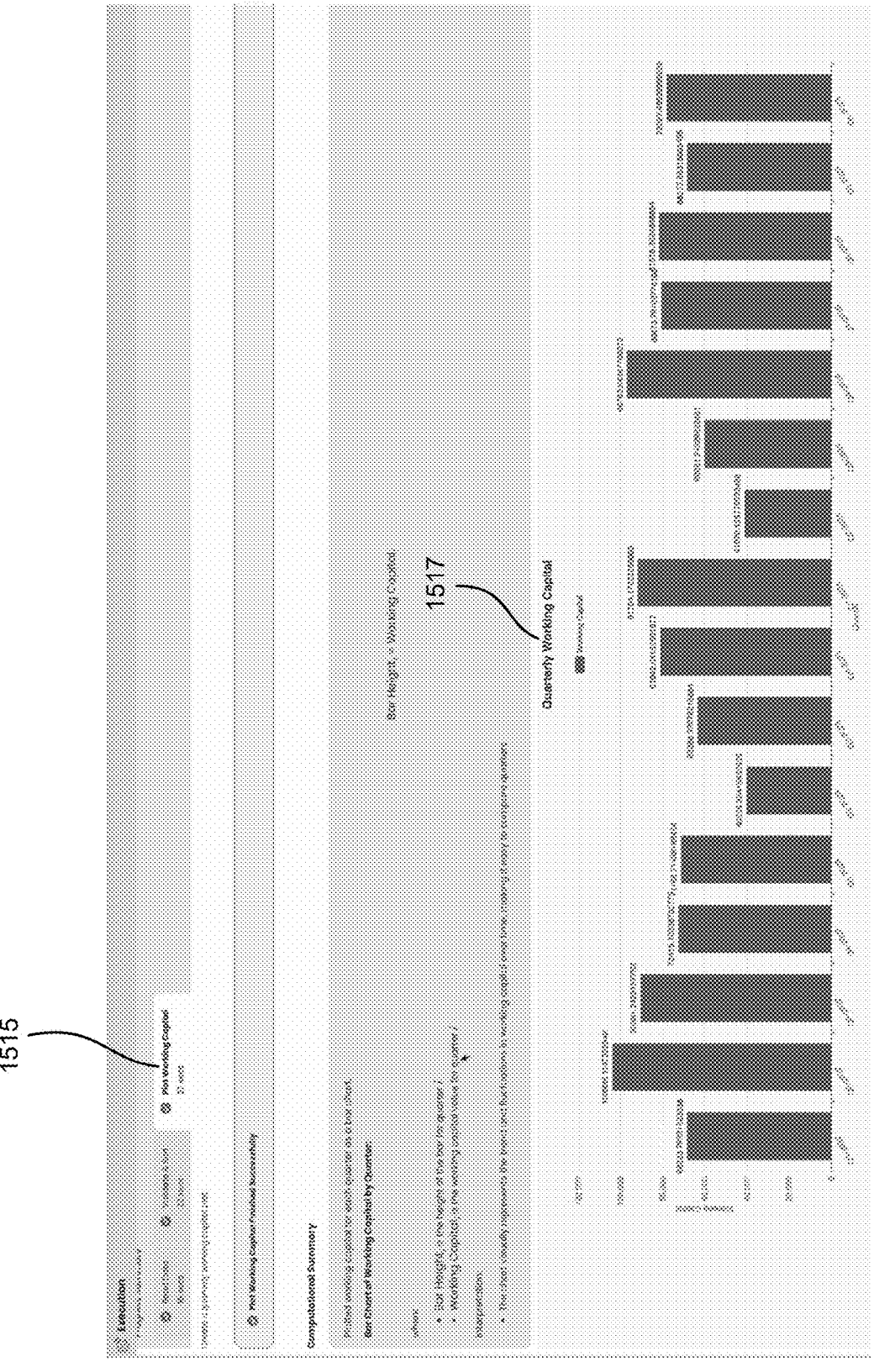
FIG. 15C shows a screenshot of a user interface displaying the result of computing the signal for various time intervals, according to an embodiment.

FIG. 15C shows a screenshot of a user interface displaying the result of computing the signal for various time intervals, according to an embodiment. The result of computing the signal may be plotted an displayed as a chart 1517, for example, a bar chart. In other embodiments, the results may be displayed in textual form, for example, as tabular data or as a different type of chart, for example, pie chart, dot plot, and so on.

Figure 15D:
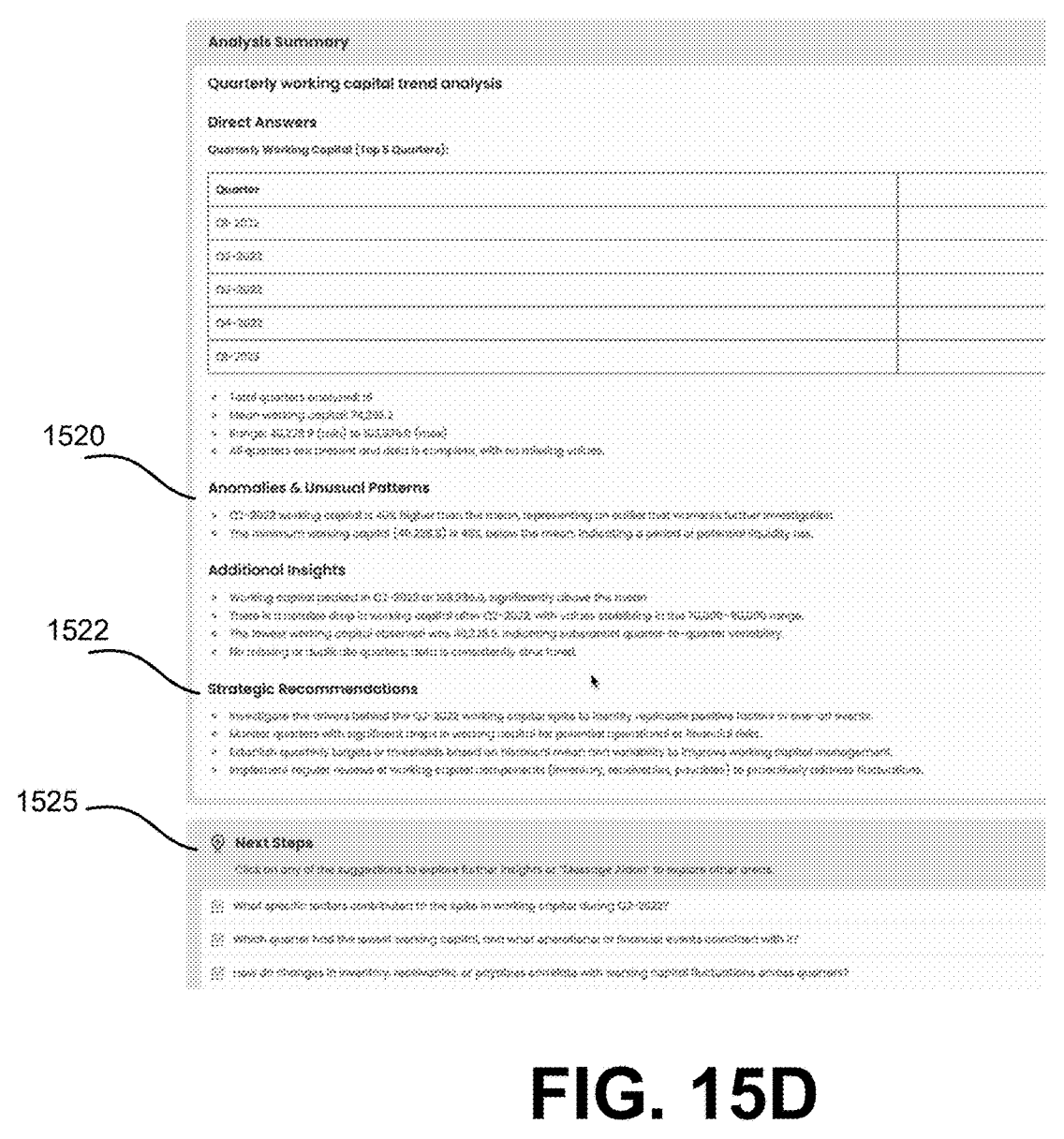
Figure 15E:
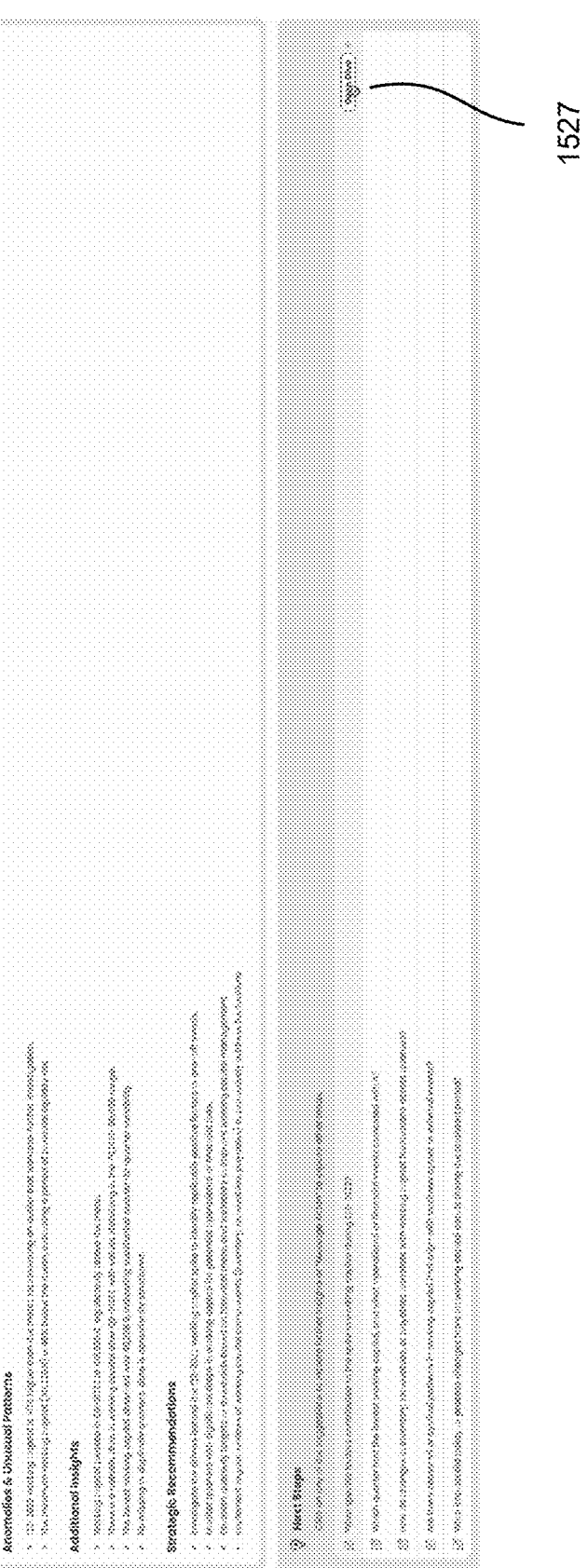
FIG. 15E shows a screenshot of a user interface for performing detailed analysis based on suggestions, according to an embodiment.

FIG. 15D shows a screenshot of a user interface displaying insights determined from the signal values including anomalies, according to an embodiment. The system analyzes the signal to determine various types of insights such as anomalies 1520 determined using the processes illustrated in FIGS. 12 and 13. The system may generate recommendations 1522 based on the signal values, for example, recommendations for example, additional signal values to compute based on the data. The system may generate next actions 1525, for example, further analysis that may be performed based on the signal values FIG. 15E shows a screenshot of a user interface for performing detailed analysis based on suggestions, according to an embodiment. For example, the system displays a widget 1527 such as a button that allows users to provide input requesting detailed analysis by performing deep dive based on specific suggestions presented via the user interface.

Figure 15F:
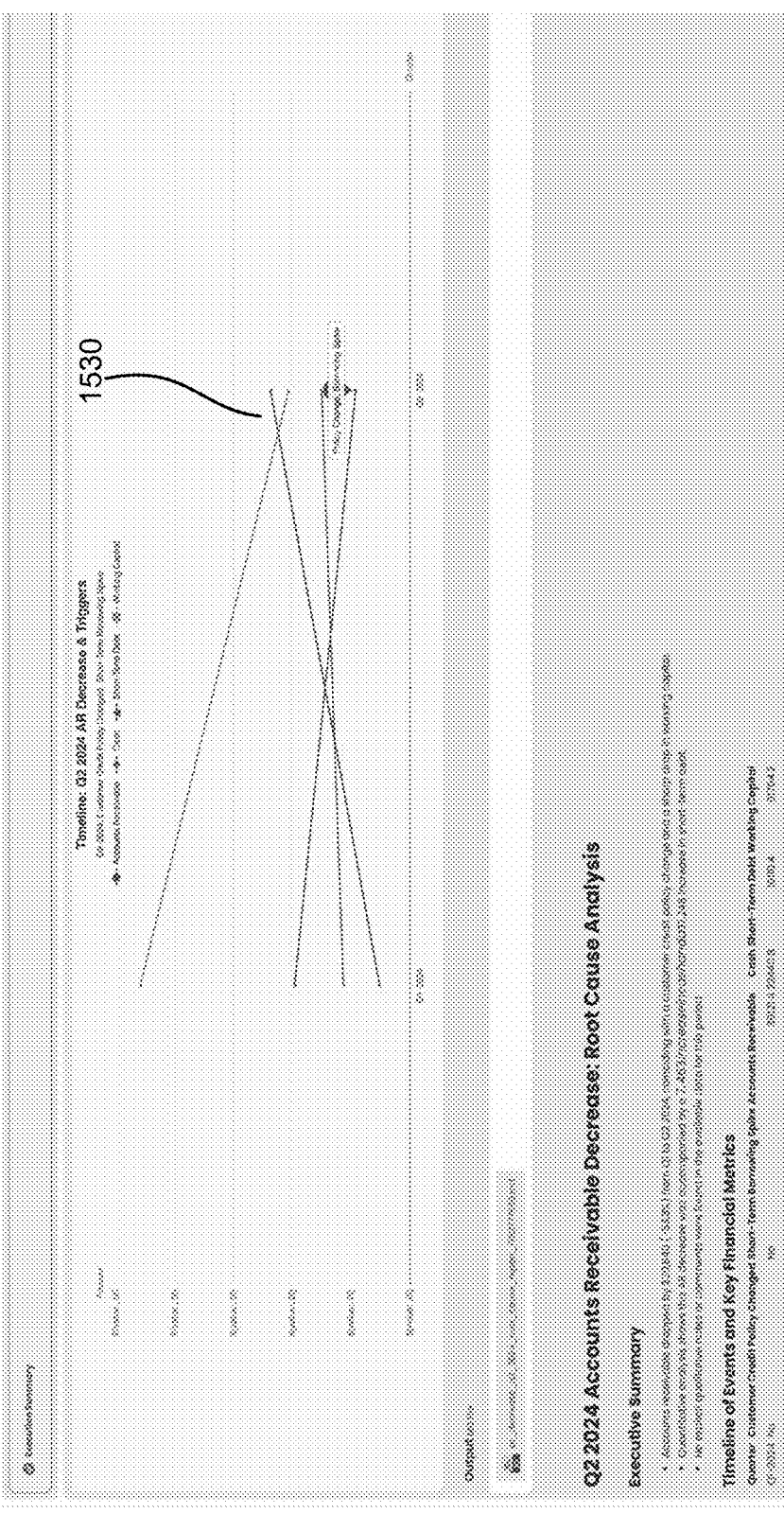
FIG. 15F shows a screenshot of a user interface displaying root cause analysis of a particular anomaly, according to an embodiment.

FIG. 15F shows a screenshot of a user interface displaying root cause analysis for a particular anomaly, according to an embodiment. The system may display charts of related data that is determined to be a cause of the anomaly. The system identifies portions 1530 of the related data that represent cause of the anomaly and may provide annotations explaining the related data and the reason why the related data is a cause of the anomaly.

Figure 15G:
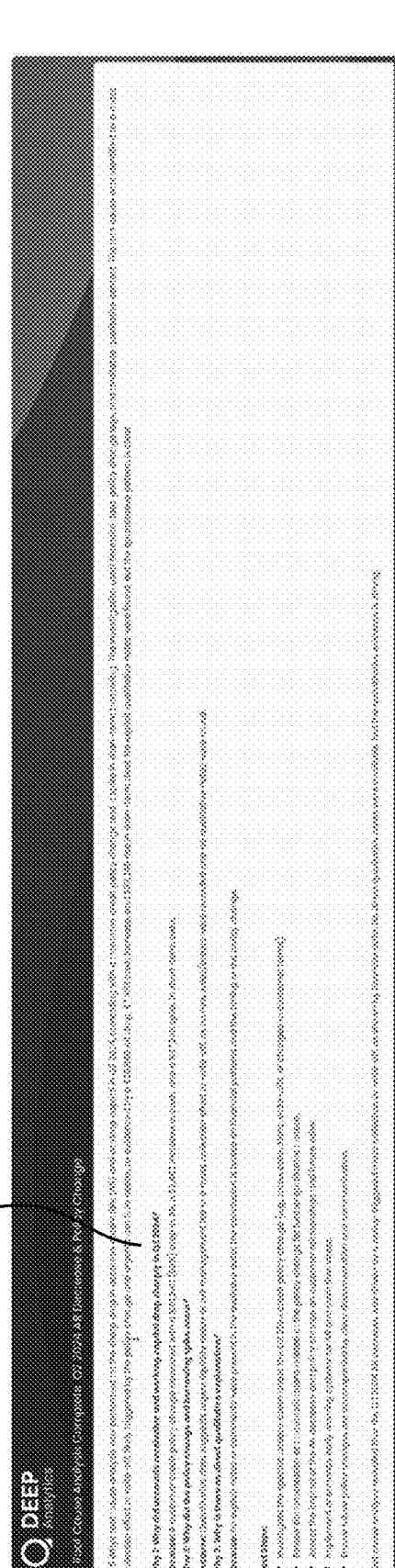
FIG. 15G shows a screenshot of a user interface displaying the execution plan for a root cause analysis of a particular anomaly, according to an embodiment.

FIG. 15G shows a screenshot of a user interface displaying the execution plan for a root cause analysis of a particular anomaly, according to an embodiment. For example, the system may display a sequence of questions 1532 that were asked to a machine learning based language model for determining the cause of the anomaly.

The techniques disclosed herein for causation analysis are also applicable to other types of ambient analysis. Accordingly, the system receives information describing the context and surroundings of an entity, for example, using sensors or other tools and analyzes the context to determine the needs of the entity. The system adapts to the environment of the entity and automatically takes actions that provide relevant assistance to the entity without requiring the entity to take an action. An entity may be a user, a computer system, an appliance, or any object being monitored. Examples of ambient analysis performed include determining cause of an anomaly, forecasting information based on the current context, detecting and monitoring any type of activity associated with an entity. For example, ambient analysis may be performed for a facility such as a smart home to automate various tasks of the facility such s adjusting temperature, lighting, security devices, and so on; monitoring vital life signs of a human, for example, a patient and automatically performing tasks such as adjusting medication or reporting health issues to an expert; monitoring inventory in a facility such as a retail store and performing intelligent inventory management, among others.

According to an embodiment, the system performs ambient analysis as follows. The system identifies a signal based on data obtained from one or more data sources. The system generates an execution plan for determining signal values of the signal based on data obtained from one or more data sources. The signal values monitor the context of an entity. The system repeatedly executes the execution plan for generating signal values. The signal values may be based on sensor data, monitoring logs generated by a system, and so on. The system evaluates the context to determine whether certain action needs to be taken. The system may store various criteria to be evaluated based on the signals monitored. The system determines if a particular action needs to be taken based on the context being monitored. For example, the system may generate a prompt describing the signals monitored and send a request to a machine learning based language model requesting the machine learning based language model to determine whether a particular action needs to be taken for the provided context. If the response generated by the machine learning based language model indicates that the particular action needs to be taken, the system may send a message to appropriate users or may invoke certain APIs (application programming interfaces) of specific tools to take an action. For example, if the action to be take represents adjusting temperature o pressure of certain location, the system may invoke APIs (application programming interfaces) of appropriate devices to adjust the temperature or pressure.

The system may determine that further analysis needs to be performed to determine whether an action needs to be performed. The system identifies one or more other data sources that store information needed for further analysis. According to an embodiment, the system generates a prompt that describes a set of data sources by specifying metadata describing the data sources and requests a machine learning based language model to identify a data source for performing a particular type of analysis. The system sends the prompt for execution to a machine learning based language model and determines the data source for performing further analysis based on the response generated by the machine learning based language model. The system may use the machine learning based language model to generate one or more queries or requests for obtaining the required information from the data source. The system processes the queries against the data source to obtain the information required for further analysis. Accordingly, the system fetches additional data intelligently from other systems—typically data source that store more fine-grained data to perform further analysis. The system finds, curates, and harmonizes fine-grained data from various data sources to perform further ambient analysis.

According to various embodiments, the system performs ambient analysis using a machine learning-based language model and initiates multiple concurrent ambient analyses in parallel. The system may perform multiple such ambient analyses concurrently tracing different signals. The system may abandon a path if subsequent signals indicate that the likelihood of that cause is weak.

According to an embodiment, a context associated with the signal is determined based on one or more of: a location associated with the signal, a time associated with the signal; or one or more users associated with the signal.

Collaborative Data Analytics

The system according to various embodiments allows multiple users to interact with the system to perform data analysis. The system allows users to specify data analytics requests using high-level natural language requests. The system generates an execution plan based on natural language requests received from a particular user and uses data analytics agents to execute the execution plan. An end user may provide natural language requests that result in the system generating an execution plan that is inadequate. For example, the execution plan may fail to generate the required output, the execution plan may generate incorrect results, the execution plan may run extremely inefficiently, for example, by taking more than a threshold amount of time for obtaining results, the system may get stuck in an endless loop, and so on. The system detects a failure of the data analytics agents executing the execution plan and determines whether to request help from another entity, for example, another data analytics agent or a user. The system changes the state of execution of the execution plan to a waiting state in which the system blocks execution until it receives an approval to proceed from an entity.

Figure 16:
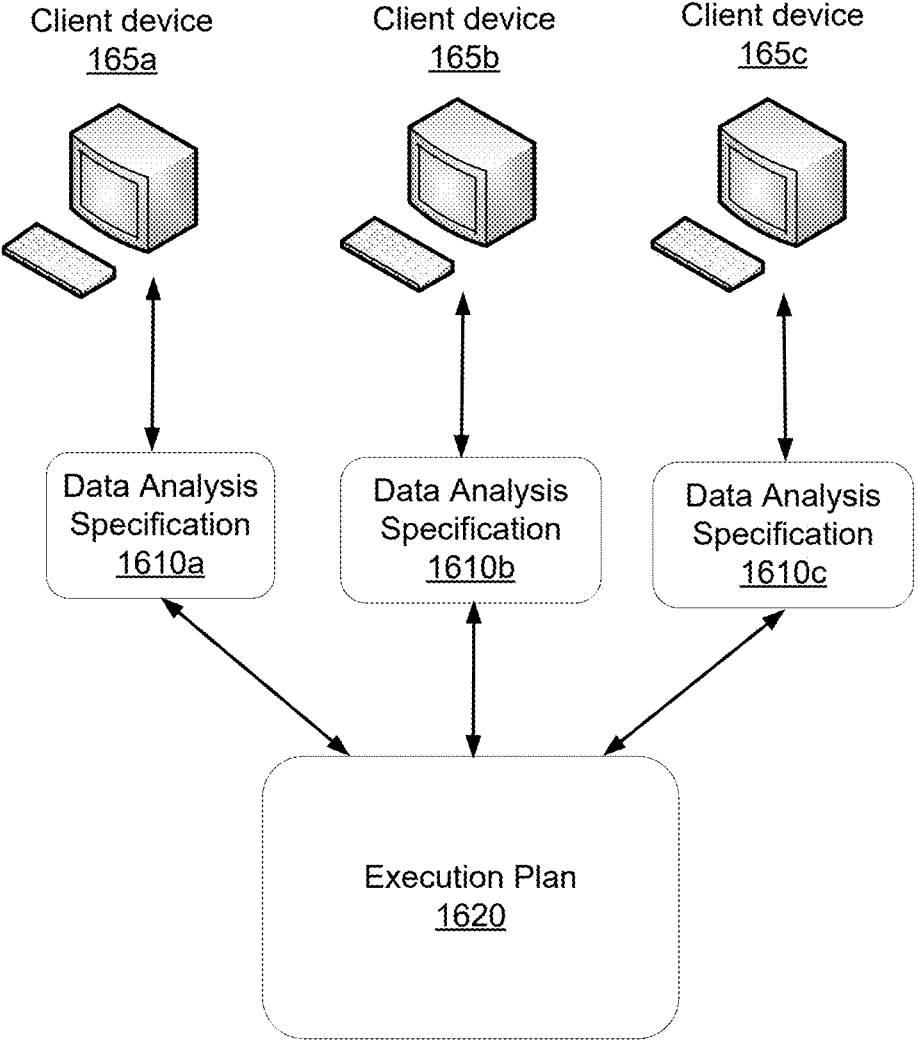
FIG. 16 illustrates a system environment for collaborative analytics based on artificial intelligence based agents, according to an embodiment.

FIG. 16 illustrates a system environment for collaborative analytics based on artificial intelligence based agents, according to an embodiment. The system environment comprises a plurality of client devices 115a, 115b, 115c interacting with a data analytics agent 110 to build an execution plan 1620 to perform data analytics based on data stored in one or more data source systems 120. The data analytics are performed in accordance with data analytics specification 1610a, 1610b, 1610c provided by users of the client devices 115. Each client device 115 executes a client application that is used by a user to (1) view information including details of the execution plan, results of execution of the execution plan 1620, logs stored during execution of the execution plan 1620, and so on; and (2) to provide input such as data analysis specification 1610 for generating and modifying the execution plan 1620. According to an embodiment, a particular user may provide data analysis specification 1610 that is used to generate an initial version of execution plan 1620. The data analytics agent 110 interacts with a machine learning based language model 240 to generate the execution plan. Other users may observe the execution plan 1620 and results of execution of the execution plan 1620 and provide specific input in the form of additional data analysis specification 1610 for modifying specific portions of the execution plan. The data analytics agent 110 interacts with the machine learning based language model 240 to modify the execution plan. This process is repeated iteratively until the execution plan achieves a target goal of data analytics.

FIG. 17 shows the system architecture of collaborative analytics module, according to an embodiment. The collaborative analytics module 280 includes an execution analysis module 1710, a routing module 1720, and a compilation module 1730. Other embodiments may include more or fewer modules than those indicated herein.

The execution analysis module 1710 analyzes execution of an execution plan for performing data analysis in accordance with one or more data analysis specifications 1610. According to an embodiment, the execution analysis module 1710 analyzes the execution based on information such as the output generated by various steps (or operations or operators) of the execution plan. According to an embodiment, the data analytics agent 110 stores information describing execution of the various steps of the execution plan as logs, for example, in a persistent storage. The logs may store information such as success or failure of individual steps or operations of the execution plan, intermediate data generated during execution of the individual steps or operations of the execution plan, warning messages, error messages, output of debug statements, and so on. The execution analysis module 1710 analyzes the logs stored as a result of execution of the execution plan to analyze the execution of the execution plan. The execution analysis module 1710 may also monitor system performance to analyze execution of the execution plan, for example, resource utilization during execution of the execution plan including the amount of memory usage, CPU (central processing unit) usage, amount of data written in persistent storage during execution, network utilization, and so on. According to an embodiment, the execution analysis module 1710 analyzes execution of the execution plan to determine whether the execution is failure in execution of the execution plan or the execution plan is executing successfully.

According to an embodiment, the execution analysis module 1710 determines that there is a failure in execution of an execution plan if the execution analysis module 1710 detects one or more of (1) an error returned by execution of one or more steps of the execution plan; (2) if the execution plan is executing in a loop by repeatedly executing the same sequence of steps; (3) if the execution plan is consuming more than a threshold amount of resources such as CPU or processing resources, memory resources, networking resources, storage resources, and so on; (4) if the execution plan is violating one or more policy constraints (for example, policy constraints of an organization), for example, by accessing data or data sources that the execution plan is not expected to access, by taking longer than a threshold amount of time to complete execution of certain operations, by executing a model in violation of a policy, and so on; (5) if the execution plan is generating incorrect results as determined by validating the results based on predetermined validation steps; for example, the data analysis may be associated with certain validation steps to determine whether the final or intermediate results generated are valid.

According to an embodiment, the execution analysis module 1710 detects failure in execution of the execution plan by generating a prompt for a machine learning based language model, the prompt comprising one or more of (1) information describing the execution of the execution plan such as intermediate results of execution, logs generated during execution, and so on; (2) description go techniques for determining whether failure has occurred by describing the failures, describing steps for detecting failures, or providing examples of successful execution and examples of executions with failures. The execution analysis module 1710 sends the prompt generated to the language model service 210 for execution by the machine learning based language model 240. The execution analysis module 1710 receives the result of execution of the machine learning based language model 240 based on the prompt. The execution analysis module 1710 determines whether a failure has occurred during execution of the execution plan based on the response received from the machine learning based language model 240. According to an embodiment, the execution analysis module 1710 repeatedly performs these steps to determine whether a failure has occurred.

The routing module 1720 routes requests for advancing data analytics computations as requested by users. According to an embodiment, the routing module 1720 receives results of analysis of the execution of the execution plan performed by the execution analysis module 1710 and determines how to route the requests associated with the data analytics computation. For example, if the routing module 1720 detects a failure in the execution of the execution plan, the routing module 1720 may route a request to a user account of a target user having a particular role, for example, a target user predetermined to be a data analytics expert. The routing module 1720 may cause the execution plan to reach a waiting state in which one or more data analytics agents executing the current step of the execution plan reach a waiting state and do not proceed until an approval is received from the target user. According to an embodiment, the system receives the approval from the target user via a user interface after which the system continues execution of the execution plan. The target user may modify the execution plan before approving the execution. For example, the target user may send data analysis specification 1610 that causes one or more portions of the execution plan to be modified for overcoming the failure. The modification requested by the target user may cause a different model to be used for performing a certain computation that is part of the execution plan. The modification requested by the target user may cause a change in flow of the execution plan, for example, by modifying certain conditions that are checked during the execution plan. The modification requested by the target user may cause certain computations to be routed to a new data analytics agent compared to the current data analytics agent. The modification requested by the target user may cause a different set of resources being used by the execution plan instead of the current resources. The modification requested by the target user may cause the execution plan to use a different data source compared to the data source being currently used by the execution plan. The system may continue execution of the modified execution plan and monitor the execution to determine whether the failure is removed. If the failure is determined to continue to exist or if a new failure is identified, the routing module 1720 may send another request to a target user, requesting the target user to intervene. According to an embodiment, the routing module 1720 determines that there is no failure in the execution of the execution plan and routes requests related to the execution plan to other data analytics agents for performing subsequent steps of the execution plan.

The target user receiving the user may be identified using a target user account. Accordingly, the routing module 1720 sends a request to a target user account that may be monitored by one or more users having a certain role. The routing module 1720 may send a request to a user account or an alias that forwards the request to a set of users having the appropriate role. Any user having the role or belonging to the predetermined set may be able to modify the execution plan and approve the execution of the execution plan.

According to an embodiment, the routing module 1720 maintains a mapping from status of execution to a target entity to which a request is routed. The mapping may be maintained as a data structure such as a mapping table that is stored in-memory. The mapping may map a status indicating a successful execution of the execution plan to a target entity represented by one or more data analytics agents as determined by the execution plan. For example, a request may be routed to a data analytics agents that is trained to perform the next step of the execution plan. The mapping may map all failures to a set of users having a particular role. The mapping may map different types of failures to different sets of target users. Accordingly, specific sets of users may be experts in resolving specific types of failures and are requested to intervene when the system detects the corresponding failures. For example, failures indicating excessive consumption of resources may be routed to users known to be experts in managing resources, whereas failure indicative of loop in the flow of the execution plan or incorrect results may be routed to users determined to be experts having knowledge of data analytics.

The compilation module 1730 compiles a data analysis specification 1610 received for generating or modifying an execution plan to either generate a new execution plan if there is no existing execution plan for the data analysis or modify an execution plan if there is an existing execution plan. According to an embodiment, the compilation module 1730 generates a prompt comprising the received data analysis specification 1610 and instructions to either generate a new execution plan or modify an existing execution plan based on the received data analysis specification 1610. According to an embodiment, the compilation module 1730 provides the prompt to the machine learning based language model 240 and receives the response generated by executing the machine learning based language model 240 using the prompt. The compilation module 1730 extracts the execution plan based on the response received from the machine learning based language model 240.

If there is an existing execution plan, the data analysis specification 1610 may provide information describing the execution plan in the prompt. For example, the compilation module 1730 may include the existing execution plan in the prompt provided to the machine learning based language model 240. According to an embodiment, the compilation module 1730 specifies instructions in the prompt describing portions of the existing execution plan that the machine learning based language model 240 should not modify while recompiling the execution plan. Accordingly, the prompt specifies instructions to modify only specific portion, or portions of the existing execution plan to satisfy the received data analysis specification 1610. This allows a user, for example, a data analysis expert to fix failures in the execution plan without modifying the execution plan significantly.

The compilation module 1730 may provide the execution plan to the machine learning based language model 240 to determine which portions of the execution plan would be impacted by a particular request to modify the execution plan. For example, the compilation module 1730 generates a prompt including the execution plan and request to modify the execution plan and request the machine learning based language model 240 to determine portions of the execution plan that are impacted by the request to modify the execution plan. The compilation module 1730 receives the response generated by executing the machine learning based language model 240 and extracts information describing the portions of the execution plan that are expected to be modified by the request. If the request to modify attempts to modify portions of the execution plan that were previously materialized, the compilation module 1730 may either deny the request to modify or send a message indicating the impact of implementing the request to modify. For example, the compilation module 1730 may further request additional approval to proceed with the request to modify the execution plan.

The compilation module 1730 uses the information identifying portions of the execution plan that are impacted by the request to modify to generate a new prompt that includes describes the request to modify the execution plan, the execution plan, and a information identifying portions of the execution plan that may be modifies as well as portions of the execution plan that may not be modified. The compilation module 1730 sends the prompt for execution of the machine learning based language model, receives a response generated by execution of the machine learning based language model, and extracts the modified execution plan from the response generated by execution of the machine learning based language model.

Figure 18:
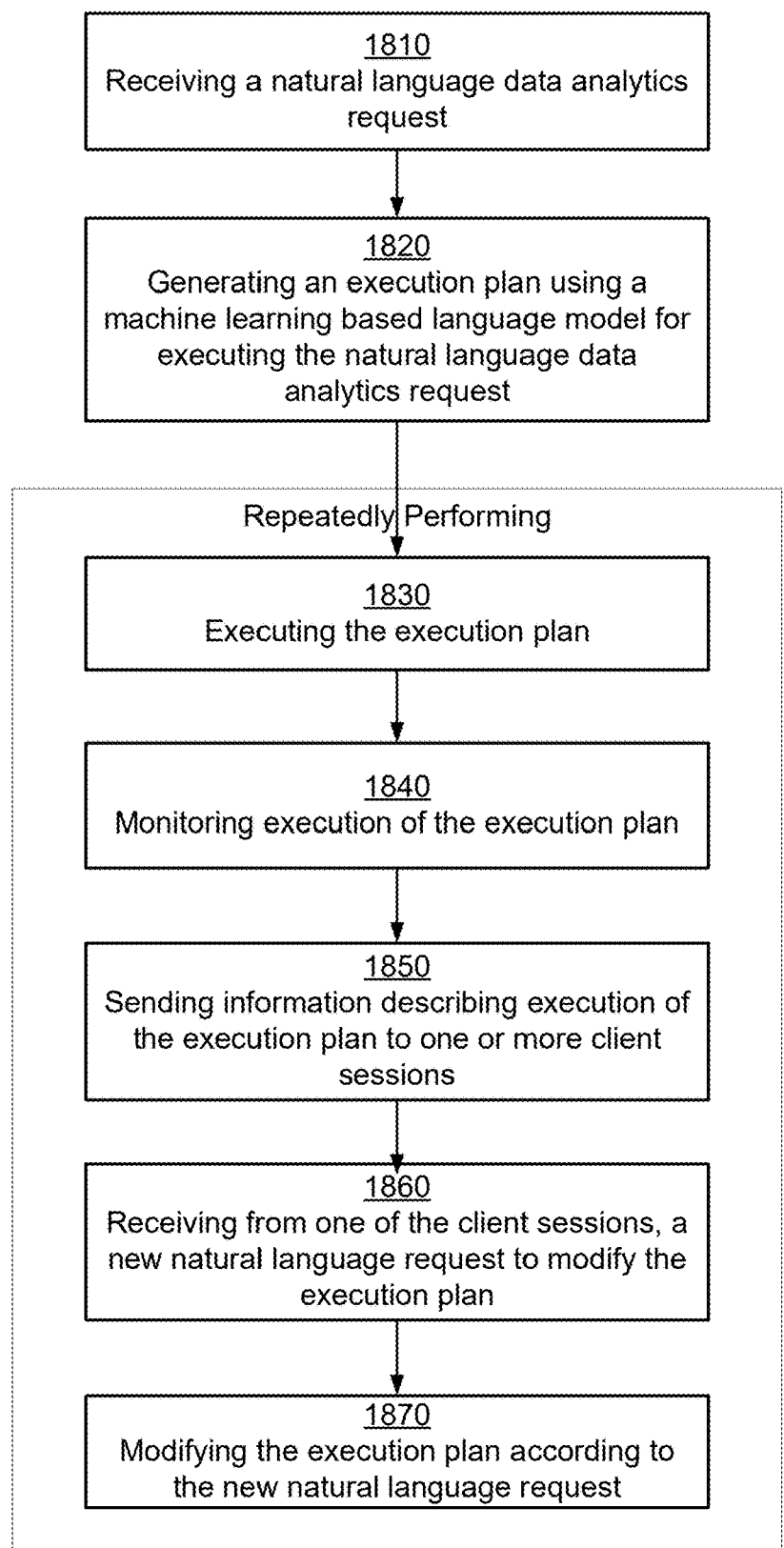
FIG. 18 is a flowchart illustrating a process for performing collaborative analytics, according to an embodiment.

FIG. 18 is a flowchart illustrating a process for performing collaborative analytics, according to an embodiment. Alternative embodiments may include more, fewer, or different steps from those illustrated in FIG. 18, and the steps may be performed in a different order from that illustrated in FIG. 18. The steps are described as being performed by a system, for example, the online system 200 and may be performed by one or more modules of the system, for example, the collaborative analytics module 280. Additionally, each of these steps may be performed automatically by the online system without human intervention.

The system receives 1810 a natural language data analytics request, for example, a data analysis specification 1610 for performing certain data analytics based on data stored in one or more data sources. The system generates 1820 an execution plan based on a machine learning based language model 240 for executing the natural language data analytics request. According to an embodiment, the system generates a prompt comprising the natural language data analytics request along with instructions to generate an execution plan and sends the prompt for execution to a machine learning based language model 240. The system receives the response generated by executing the machine learning based language model 240 and extracts an initial execution plan from the response.

After generating the initial execution plan the system allows a plurality of users to iteratively modify the execution plan. Accordingly, the steps 1830, 1840, 1850, 1860, and 1870 may be executed repeatedly, a plurality of times. A user may simply review the generated execution plan and provide instructions for modifying the execution plan. Alternatively, the system executes 1830 the execution plan by executing the individual steps of the execution plan. The steps of the execution plan may be executed by one or more data analytics agents. For example, a data analytics agent may execute a step to generate an intermediate result, and provide the intermediate result to another data analytics agent for executing the subsequent step of the execution plan.

The system monitors 1840 execution of the execution plan. For example, the system may monitor the results obtained by executing various steps of the execution plan or the system may monitor the logs generated by executing the steps of the execution plan. The system sends 1850 the information describing the execution of the execution plan to one or more client sessions that may be created for interacting with users via one or more client devices. Accordingly, one or more users can monitor the execution of the execution plan. A user monitoring the execution plan may modify the execution plan by specifying appropriate data analysis specification 1610 for the modification. For example, a data analytics expert may determine that a particular data analysis model being used by the execution plan is suboptimal and should be replaced with a different data analysis model. Accordingly, the data analysis expert may provide data analysis specification 1610 specifying that the execution plan should be modified to use the other data analysis model. Similarly, a system administrator may determine that the execution plan is using suboptimal resources for the execution and may specify a different set of resources to use via a data analysis specification 1610. According to an embodiment, the system uses data analytics agents to monitor various aspects of the execution of the execution plan such as the data analysis models user, the data sources used, the resources used and so on and provide the appropriate information to the users monitoring the execution.

Accordingly, the system receives 1860 from one or more client sessions, a new natural language request (or a new data analysis specification 1610) for modifying the execution plan. The system modifies 1870 the execution plan based on the new natural language request and continues executing the modified execution plan to repeat steps 1830, 1840, 1850, 1860, and 1870. If there are no more new natural language requests received to modify the execution plan, the system may determine that the execution plan is finalized and send a message to the client sessions indicating completion of the data analysis process.

According to an embodiment, the system monitors the execution of the execution plan to detect occurrence of failures during execution of the execution plan. The system routes requests to appropriate entities including client sessions or data analytics agents, requesting helps in case a failure is detected in execution of the execution plan.

Figure 19:
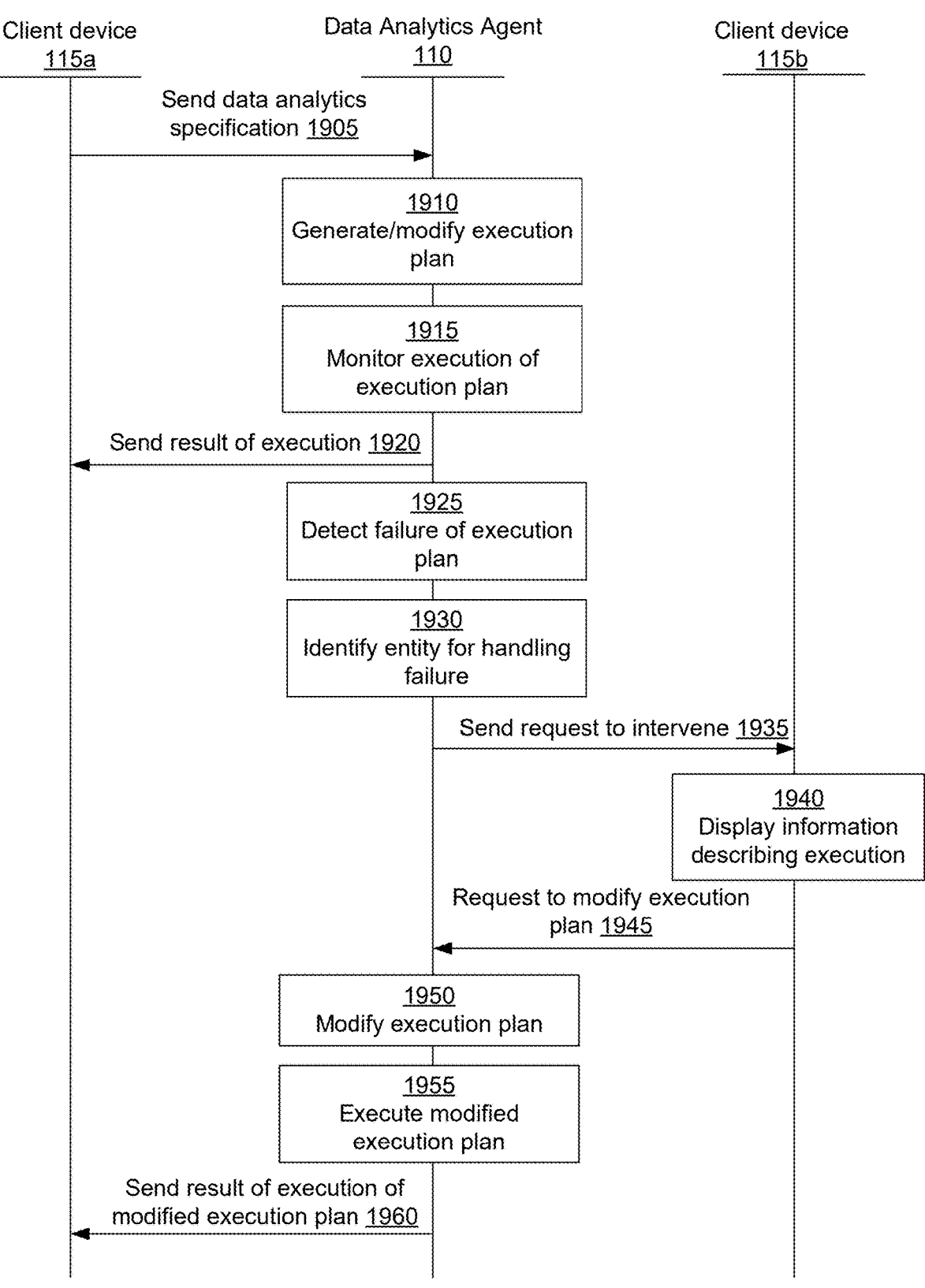
FIG. 19 is an interaction diagram illustrating interactions between various entities performing collaborative analytics in view of detection of failures, according to an embodiment.

FIG. 19 is an interaction diagram illustrating interactions between various entities performing collaborative analytics in view of detection of failures, according to an embodiment. The interaction is between a data analytics agent 110 and client sessions created by client devices 115a, 115b but may also be between the data analytics agent 110 and entities such as data analytics agents or between the data analytics agent 110 and client devices and data analytics agents.

A client device 115a sends 1905 a data analytics specification to the data analytics agent 110. The data analysis specification is a natural language request. The data analytics agent 110 generates or modifies an execution plan based on the data analytics specification. For example, if the data analysis specification is received when there is no existing execution plan, the data analytics agent 110 compiles the data analysis specification 1610 to generate 1910 an initial execution plan. If the data analytics agent 110 receives the data analysis specification 1610 when there is an existing execution plan, the data analytics agent 110 modifies 1410 the existing execution plan. The data analytics agent 110 monitors 1915 the execution of the execution plan, for example, by monitoring the outputs generated by various steps or by monitoring logs generated during the execution. The data analytics agent 110 sends 1920 results of execution of the execution plan to the client device 115a, for example, for display via a user interface.

The data analytics agent 110 may detect 1925 a failure during execution of the execution plan. If the data analytics agent 110 detects 1925 a failure during execution of the execution plan, the data analytics agent 110 identifies an entity for handling the failure. For example, the data analytics agent 110 may determine the type of failure, for example, whether the failure was caused by excessive use of resources, whether the failure was a logical failure caused by use of incorrect models, and so on. The data analytics agent 110 may use a mapping from types of failures to entities that are able to handle failures of each type to determine an entity for handling the failure detected. For example, the entity may be a user of a client device 115b. The entity may be a user account of a user. Alternatively, the entity may be another data analytics agent 110 that is trained to handle specific types of failures. The data analytics agent 110 sends 1935 a request to intervene to the entity, for example, to the client device 115b. The request to intervene may specify information describing the execution of the execution plan. The client device 115b may display 1940 the information describing the execution of the execution plan via a user interface to the user. The client device 115b receives a request to modify the execution plan from the user and sends 1945 the request to modify the execution plan to the data analytics agent 110.

The data analytics agent 110 modifies 1950 the execution plan in accordance with the request to modify the execution plan received. The data analytics agent 110 continues to execute 1945 the modified execution plan. The data analytics agent 110 sends 1960 the result of execution of the modified execution plan to the client device 115*a*.

Technical Improvements

The techniques disclosed improve the efficiency of execution of analytics reports based on data stored in heterogeneous data stores. The system allows generating context specific data analytics agents that are trained to perform efficiently in specific contexts, for example, for specific types of data sources or for specific vertical industries. The context specific data analytics agents are generated simply by using the system to process several natural language data analytics requests and answering questions generated by the system to guide the system through generation of execution plans. The context specific data analytics agents may be generated without adjusting parameters of a machine learning model. As a result, generation of the data analytics agents is an efficient process compared to training a machine learning based model using gradient descent technique or another technique that adjusts the parameters of the model.

A machine learning based language model may include stochastic components that result in generation of non-deterministic outputs. As a result, a machine learning based language model may generate different responses each time the machine learning based language model is executed for the same input. A different execution plan may be generated each time the machine learning based language model is executed even if the same natural language data analytics request is processed using the same prompt that was previously provided as input to the machine learning based language model. This is a technical problem specific to machine learning based language models that are non-deterministic. The techniques disclosed provide a technical solution to this problem by marking sets of instructions as materialized and modifying the prompts to ensure that the materialized sets of instructions are not changed across executions of the machine learning based language model, even if the remaining execution plan is changed. The processes described herein incrementally mark sets of instructions as materialized as the execution plan is iteratively refined, thereby making the output of the machine learning based language model deterministic at least for specific portions of the execution plans that may be critical to generating the answer. This allows the execution plans to generate consistent reports even if regenerated. A non-deterministic output of reports may not be acceptable for several applications or problem domains.

Furthermore, the materialized sets of instructions of execution plans may be reused across execution plans, thereby allowing new natural language data analytics requests to be processed efficiently and perform data processing in a manner that is consistent with previously generated reports. For example, if a natural language data analytics request is modified to change certain parts of the data analysis, the system ensures that the remaining parts of the data analysis use stored sets of instructions that were marked as materialized. That way the generation of the execution plan for the new natural language data analytics request is efficient due to reuse of the computational effort that was previously performed. Furthermore, the result of execution of the new natural language data analytics requests based on the new execution plan is consistent with previously executed natural language data analytics requests in spite of variations in the requests. For example, a change in one step of the analysis does not cause a nondeterministic machine learning based language model to generate a different execution plan that uses different sets of instructions for individual steps compared to previously generated sets of instructions.

The system further provides a representation for storing instructions representing policy constraints of an organization. The system provides a mechanism to efficiently determine the impact of changing policy constraints for an organization. Conventional techniques are unable to accurately determine the impact of making changes to policy constraints, thereby resulting in significant consumption of resources in enforcing the changes. The system allows efficiently identifying the data sets that are impacted by a policy constraint change. The system further allows identifying sets of instructions that need to be regenerated. As a result, the system improves the efficiency of implementing changes to policy constraints. Conventional techniques may require regeneration of more datasets than needed or regeneration of more execution plans than are impacted by the policy constraint change, thereby wasting computing and other resources.

The system provides improved user interactions by users by allowing collaborative data analytics using natural language specifications. Multiple users are able to view the execution of the execution plan and modify the execution plan. This results in generation of improved execution plans since multiple users with different expertise are able to modify the execution plan. For example, a system expert with knowledge of computing resource utilization is able to monitor the execution of the execution plan to modify and improve the computing resource utilization of the execution plan. Furthermore, the system selectively modifies the execution plan based on input from different users. For example, the system provides instructions in the form of a prompt to the machine learning based language model 240 instructing the machine learning based language model 240 to modify only specific portions of the execution plan while retaining the remaining execution plan or at least retaining specific portions of the execution plan that were previously generated based on input from other users. Since execution of a machine learning based language model 240 may be non-deterministic, the machine learning based language model 240 may regenerate an entirely different execution plan each time a user attempts to modify the execution plan. This may introduce new issues or problems with the execution plan that did not exist in the previous version of the execution plan. Non-determinism is a technological aspect of machine learning based language model 240 that causes the machine learning based language model 240 to generate results that may not be repetitive. The system ensures that the machine learning based language model 240 modifies the execution plan in a controlled manner in spite of the non-determinism. Accordingly, the techniques disclosed provide a technological improvement that solves the technical problem of non-determinism of machine learning based language models 240.

The techniques disclosed herein may be used by enterprises to determine anomalies in signals and their causes for various types of systems. The signals may be related to data processed by an enterprise but are not limited to financial aspects and are applicable to other domains, for example, instrumentation of equipment, analysis of sensor data, analysis of user data, and so on. The root cause may indicate a lack of resources, for example, system resources, people resources, or financial resources. The system may automatically allocate/reallocate resources based on the root cause to reduce the anomaly. The system may perform actions subject to user approval. The system may generate a recommendation for sending to a user to take action. If a particular system in a distributed system is determined to cause an anomaly, the system may take corrective action, for example, by balancing load, allocating additional resources. The system provided technical improvement by automatically recognizing anomalies and taking corrective actions to reduce impact of anomalies or by preventing anomalies from occurring in future.

The system performs tuning of the machine learning based language model for determining causes of anomalies in signal values. The tuning of the machine learning based language model may be performed by training the machine learning based language model using domain specific data, for example, proprietary data of an enterprise. Accordingly, the parameters of the machine learning based language model are adjusted based on training data represented by the enterprise data. The system may perform tuning of the model by tuning the prompts representing structured query input that is provided as input to the machine learning based language model. The system tunes the prompt by including domain specific examples in the prompt, for example, examples of previous root causes determined for signal anomalies. The system may maintain a database of examples of root causes and corresponding anomalies that are encountered by the system and includes the examples in future prompts. As the number of examples increases over time, the system selects the best examples, for example, a set of examples that maximize the variety of root causes and anomalies and eliminate redundancy in the examples.

Additional Considerations

The foregoing description of the embodiments has been presented for the purpose of illustration; many modifications and variations are possible while remaining within the principles and teachings of the above description. The foregoing description of the embodiments has been presented for the purpose of illustration; many modifications and variations are possible while remaining within the principles and teachings of the above description. Embodiments comprise computer-implemented methods comprising steps of processes described herein. Embodiments comprise non-transitory computer readable storage medium storing instructions that when executed by one or more computer processors cause the one or more computer processors to perform steps of methods disclosed herein. Embodiments comprise computer system comprising one or more computer processors and a non-transitory computer readable storage medium storing instructions that when executed by one or more computer processors cause the one or more computer processors to perform steps of method disclosed herein.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method for collaborative data analytics based on natural language data analytics requests, comprising:

receiving, from a client device, a natural language data analytics request based on data stored in one or more data stores;

generating an execution plan for processing the natural language data analytics request using a machine learning based language model;

executing the execution plan for processing the natural language data analytics request;

detecting a failure in executing the execution plan for processing the natural language data analytics request;

responsive to detecting the failure in executing the execution plan:

identifying a target entity for handling the failure in executing the execution plan, and sending information describing execution of the execution plan to the target entity;

receiving a request to modify the execution plan from the target entity;

modifying the execution plan based on the request to modify the execution plan by executing the machine learning based language model to generate a modified execution plan;

executing the modified execution plan; and sending a result of execution of the modified execution plan to the client device.

2. The computer-implemented method of claim 1, wherein generating the execution plan for processing the natural language data analytics request comprises:

generating a prompt for the machine learning based language model, the prompt describing the natural language data analytics request;

sending the prompt for execution of the machine learning based language model;

receiving a response generated by execution of the machine learning based language model; and extracting an execution plan from the response generated by execution of the machine learning based language model.

3. The computer-implemented method of claim 1, wherein modifying the execution plan based on the request to modify the execution plan comprises:

generating a prompt for the machine learning based language model, the prompt describing the request to modify the execution plan, the execution plan, and a request to modify a first portion of the execution plan while retaining at least a second portion of the execution plan;

sending the prompt for execution of the machine learning based language model;

receiving a response generated by execution of the machine learning based language model; and extracting the modified execution plan from the response generated by execution of the machine learning based language model.

4. The computer-implemented method of claim 1, wherein detecting the failure is performed by a data analytics agent, wherein responsive to detecting the failure in executing the execution plan, transitioning the data analytics agent to a wait state, wherein the data analytics agent waits for the target entity to take action.

5. The computer-implemented method of claim 1, wherein the execution plan comprises a set of steps, wherein a step performs one or more of:

accessing data stored in a data store;

cleansing data accessed from a data store;

analyzing data obtained from a data store to compute one or more metrics;

generate a report; or configure visualization of a report.

6. The computer-implemented method of claim 1, wherein detecting the failure comprises:

generating a prompt for the machine learning based language model, the prompt describing execution of the execution plan and requesting the machine learning based language model to determine whether there is a failure in execution of the execution plan;

sending the prompt for execution of the machine learning based language model;

receiving a response generated by execution of the machine learning based language model; and extracting an execution plan from the response generated by execution of the machine learning based language model, the response indicating whether there is a failure in execution of the execution plan.

7. The computer-implemented method of claim 1, wherein the failure indicates one or more of:

an incorrect result generated by executing a step of the execution plan, one or more steps of the execution plan are taking longer than a threshold amount of time for execution, or one or more steps of the execution plan are consuming greater than a threshold amount of computing resources.

8. A non-transitory computer readable storage medium storing instructions that when executed by one or more computer processors cause the one or more computer processors to perform steps for collaborative data analytics based on natural language data analytics requests, the steps comprising:

receiving, from a client device, a natural language data analytics request based on data stored in one or more data stores;

generating an execution plan for processing the natural language data analytics request using a machine learning based language model;

executing the execution plan for processing the natural language data analytics request;

detecting a failure in executing the execution plan for processing the natural language data analytics request;

responsive to detecting the failure in executing the execution plan:

identifying a target entity for handling the failure in executing the execution plan, and sending information describing execution of the execution plan to the target entity;

receiving a request to modify the execution plan from the target entity;

modifying the execution plan based on the request to modify the execution plan by executing the machine learning based language model to generate a modified execution plan;

executing the modified execution plan; and sending a result of execution of the modified execution plan to the client device.

9. The non-transitory computer readable storage medium of claim 8, wherein the instructions for generating the execution plan for processing the natural language data analytics request causes the one or more computer processors to further perform steps comprising:

generating a prompt for the machine learning based language model, the prompt describing the natural language data analytics request;

sending the prompt for execution of the machine learning based language model;

receiving a response generated by execution of the machine learning based language model; and

extracting an execution plan from the response generated by execution of the machine learning based language model.

10. The non-transitory computer readable storage medium of claim 8, wherein the instructions for modifying the execution plan based on the request to modify the execution plan causes the one or more computer processors to further perform steps comprising:

generating a prompt for the machine learning based language model, the prompt describing the request to modify the execution plan, the execution plan, and a request to modify a first portion of the execution plan while retaining at least a second portion of the execution plan;

sending the prompt for execution of the machine learning based language model;

receiving a response generated by execution of the machine learning based language model; and extracting the modified execution plan from the response generated by execution of the machine learning based language model.

11. The non-transitory computer readable storage medium of claim 8, wherein detecting the failure is performed by a data analytics agent, wherein responsive to detecting the failure in executing the execution plan, transitioning the data analytics agent to a wait state, wherein the data analytics agent waits for the target entity to take action.

12. The non-transitory computer readable storage medium of claim 8, wherein the execution plan comprises a set of steps, wherein a step performs one or more of:

accessing data stored in a data store;

cleansing data accessed from a data store;

analyzing data obtained from a data store to compute one or more metrics;

generate a report; or configure visualization of a report.

13. The non-transitory computer readable storage medium of claim 8, wherein detecting the failure comprises:

generating a prompt for the machine learning based language model, the prompt describing execution of the execution plan and requesting the machine learning based language model to determine whether there is a failure in execution of the execution plan;

sending the prompt for execution of the machine learning based language model;

receiving a response generated by execution of the machine learning based language model; and extracting an execution plan from the response generated by execution of the machine learning based language model, the response indicating whether there is a failure in execution of the execution plan.

14. The non-transitory computer readable storage medium of claim 8, wherein the failure indicates one or more of:

an incorrect result generated by executing a step of the execution plan, one or more steps of the execution plan are taking longer than a threshold amount of time for execution, or one or more steps of the execution plan are consuming greater than a threshold amount of computing resources.

15. A computer system comprising:

one or more computer processors; and a non-transitory computer readable storage medium storing instructions that when executed by one or more computer processors cause the one or more computer processors to perform steps for collaborative data analytics based on natural language data analytics requests, comprising:

receiving, from a client device, a natural language data analytics request based on data stored in one or more data stores;

generating an execution plan for processing the natural language data analytics request using a machine learning based language model;

executing the execution plan for processing the natural language data analytics request;

detecting a failure in executing the execution plan for processing the natural language data analytics request;

responsive to detecting the failure in executing the execution plan:

identifying a target entity for handling the failure in executing the execution plan, and sending information describing execution of the execution plan to the target entity;

receiving a request to modify the execution plan from the target entity;

modifying the execution plan based on the request to modify the execution plan by executing the machine learning based language model to generate a modified execution plan;

executing the modified execution plan; and sending a result of execution of the modified execution plan to the client device.

16. The computer system of claim 15, wherein the instructions for generating the execution plan for processing the natural language data analytics request causes the one or more computer processors to further perform steps comprising:

generating a prompt for the machine learning based language model, the prompt describing the natural language data analytics request;

sending the prompt for execution of the machine learning based language model;

receiving a response generated by execution of the machine learning based language model; and extracting an execution plan from the response generated by execution of the machine learning based language model.

17. The computer system of claim 15, wherein the instructions for modifying the execution plan based on the request to modify the execution plan causes the one or more computer processors to further perform steps comprising:

generating a prompt for the machine learning based language model, the prompt describing the request to modify the execution plan, the execution plan, and a request to modify a first portion of the execution plan while retaining at least a second portion of the execution plan;

sending the prompt for execution of the machine learning based language model;

receiving a response generated by execution of the machine learning based language model; and extracting the modified execution plan from the response generated by execution of the machine learning based language model.

18. The computer system of claim 15, wherein the execution plan comprises a set of steps, wherein a step performs one or more of:

accessing data stored in a data store;

cleansing data accessed from a data store;

analyzing data obtained from a data store to compute one or more metrics;

generate a report; or configure visualization of a report.

19. The computer system of claim 15, wherein detecting the failure comprises:

generating a prompt for the machine learning based language model, the prompt describing execution of the execution plan and requesting the machine learning based language model to determine whether there is a failure in execution of the execution plan;

sending the prompt for execution of the machine learning based language model;

receiving a response generated by execution of the machine learning based language model; and extracting an execution plan from the response generated by execution of the machine learning based language model, the response indicating whether there is a failure in execution of the execution plan.

20. The computer system of claim 15, wherein the failure indicates one or more of:

an incorrect result generated by executing a step of the execution plan, one or more steps of the execution plan are taking longer than a threshold amount of time for execution, or one or more steps of the execution plan are consuming greater than a threshold amount of computing resources.

\* \* \* \* \*